US008684810B2

(12) United States Patent
Seelig et al.

(10) Patent No.: US 8,684,810 B2
(45) Date of Patent: Apr. 1, 2014

(54) GAMING DEVICE DISPLAY AND METHOD OF USE

(75) Inventors: Jerald C. Seelig, Absecon, NJ (US); Lawrence M. Henshaw, Hammonton, NJ (US)

(73) Assignee: IGT, Reno, NV (US)

( * ) Notice: Subject to any disclaimer, the term of this patent is extended or adjusted under 35 U.S.C. 154(b) by 2181 days.

(21) Appl. No.: 10/883,952

(22) Filed: Jul. 2, 2004

(65) Prior Publication Data

US 2004/0248644 A1 Dec. 9, 2004

Related U.S. Application Data

(63) Continuation-in-part of application No. 10/245,531, filed on Sep. 16, 2002, now Pat. No. 6,817,945.

(51) Int. Cl.
*A63F 13/00* (2006.01)
*G07F 17/34* (2006.01)

(52) U.S. Cl.
USPC .................. 463/16; 463/17; 463/20; 463/22; 463/25; 463/46; 273/143 R; 273/138.2

(58) Field of Classification Search
USPC .......... 463/20, 17, 25, 46, 16, 22; 273/143 R, 273/138, 138.2
See application file for complete search history.

(56) References Cited

PUBLICATIONS

"Phantom Haus", Williams Electronic Games, Inc., Jun. 1996.*

* cited by examiner

*Primary Examiner* — Benjamin Layno
(74) *Attorney, Agent, or Firm* — Foley & Lardner LLP

(57) ABSTRACT

A display device comprising a plurality of activatable display segments, a player input device and a controller. The plurality of activatable display segments are positioned to be viewed by a player, each display segment being configured to be individually activated and to communicate a potential outcome of a game. The player input device is positioned to be activated by the player, the player input device being configured to transmit a signal when the player activates the input device. The controller is in communication with each display segment and the player input device. The controller is configured to cause the display segments to be randomly and sequentially activated and deactivated; randomly determine an outcome of the game; determine at least one display segment that can communicate the outcome of the game; receive the signal produced by input device, when the player activates the input device; cause the display segments to stop being randomly and sequentially activated and deactivated; and cause the display segment that can communicate the outcome of the game to be activated, wherein the outcome of the game is communicated to the player and it appears that the outcome of the game was at least partially influenced by when the player activated the player input device.

16 Claims, 19 Drawing Sheets

GAMING DEVICE DISPLAY AND METHOD OF USE

CROSS REFERENCES TO RELATED APPLICATIONS

This application is a continuation-in-part application of U.S. patent application Ser. No. 10/245,531 filed on Sep. 16, 2002 now U.S. Pat. No. 6,817,945, which is incorporated herein by reference.

FIELD OF THE INVENTION

The present invention relates to a gaming device display and method of use. More particularly, the present invention relates to a gaming device display with a plurality of display segments.

BACKGROUND

Gaming Devices

Gaming devices are well known in the art and a large variety of gaming devices have been developed. In general, gaming devices allow users or players to play a game. In many casino-type gaming devices, the outcome of the game depends, at least in part, on a randomly generated event. For example, a gaming device may use a random number generator to generate a random or pseudo-random number. The random number may then be compared to a predefined table to determine the outcome of the event. If the random number falls within a certain range of numbers on the table, the player may win a predefined prize. The table may also contain display information that allows the gaming device to generate a display that corresponds to the outcome of the game. The gaming device may present the outcome of the game on a large variety of display devices, such as mechanical spinning reels or video screens.

Bonus Prizes

Some gaming devices award bonuses in addition to prizes that are awarded in the primary game. A bonus can be defined as an additional prize that is awarded to the player when a predefined event occurs. An example of a bonus game can be found in U.S. Pat. No. 5,848,932 issued to Adams. One of the gaming devices described in this document comprises three spinning reels and a spinning wheel bonus display. When predetermined indicia are displayed on the spinning reels of the primary game, the wheel can be activated to indicate a bonus prize. The bonus prize is awarded in addition to any prizes awarded in the primary game.

Generally, bonus prizes are offered in such games in order to increase the excitement and enjoyment experienced by players. This attracts more players to the game and encourages players to play longer. When gaming devices attract more players and the players play longer, they tend to be more commercially successful relative to other gaming devices.

Display Devices

In addition, highly visible display devices are utilized on gaming devices in order to attract players. Once players are attracted to the gaming device, they tend to play longer because the display device enhances the stimulation and excitement experienced by players. It is, therefore, desirable for gaming devices to incorporate highly visible display devices.

The applicants believe that display devices tend to be more successful if they are a derivation of a well-known game or theme. They are more successful because players tend to be drawn to games that they instantly recognize. Many players are reluctant to try completely new games because they must spend time to learn the new game. It is, therefore, desirable to provide display devices that are based on well-known games or themes.

It has also been found that players enjoy games in which they perceive some influence on the outcome of the game. If a player feels that the player can change the outcome of the game by exercising some degree of skill or judgment, the player is likely to player longer and to enjoy the gaming experience more. Therefore, it is desirable to provide the impression that a player has some control over the outcome of a game.

SUMMARY OF ONE EMBODIMENT OF THE INVENTION

Advantages of One or More Embodiments of the Present Invention

The various embodiments of the present invention may, but do not necessarily, achieve one or more of the following advantages:

the ability to provide the impression that a player has some control over the outcome of a game; and the ability to provide an attractive and entertaining display;

the ability to display potential prizes; and the ability to randomly and sequentially activate display segments.

These and other advantages may be realized by reference to the remaining portions of the specification, claims, and abstract.

Brief Description of One Embodiment of the Present Invention

At least one of the embodiments of the present invention comprises a method of playing a game. The method comprises, not all necessarily in the order shown, providing a plurality of activatable segments, each activatable segment being configured to communicate a potential outcome of the game; randomly and sequentially activating and deactivating the plurality of activatable segments of the display device; providing a player input device; allowing a player to manipulate the player input device while the plurality of activatable segments are being randomly activated and deactivated; randomly determining the outcome of the game; determining at least one activatable segment that communicates the outcome of the game; and subsequent to the player manipulating the player input device, activating the activatable segment of the display device that communicates the outcome of the game in such a way to communicate the outcome of the game to the player, wherein it appears that the outcome of the game was at least partially influenced by when the player manipulated the player input device.

Another embodiment of the present invention comprises a gaming device. The gaming device comprises a plurality of activatable display segments, a player input device and a controller. The activatable display segments are positioned to be viewed by a player, each display segment being configured to be individually activated and to communicate a potential outcome of a game. The player input device is positioned to be activated by the player and it is configured to transmit a signal when the player activates the input device. The controller is in communication with each display segment and the player input device and it is configured to cause the display segments to be randomly and sequentially activated and deactivated; randomly determine an outcome of the game; determine at least one display segment that can communicate the outcome of the game; receive the signal produced by input device, when the player activates the input device; cause the display segments to stop being randomly and sequentially activated and deactivated; and cause the display segment that can communicate the outcome of the game to be activated, wherein the outcome of the game is communicated to the player and it appears that the outcome of the game was at least partially influenced by when the player activated the player input device.

The above description sets forth certain features of the preferred embodiments disclosed herein. There are other features that will become apparent to those skilled in the art from this specification. In this respect, before explaining the preferred embodiments of the invention in detail, it is to be understood that the invention is not limited in its application to the details of the construction and to the arrangement of the components set forth in the following description or as illustrated in the drawings, nor is the invention necessarily a solution of each problem noted in the Background section above. In addition, the various disclosed embodiments are capable of being practiced and carried out in various ways. Also, it is to be understood that the phraseology and terminology employed herein are for the purpose of brief description and should not be regarded as limiting.

In the Detailed Description below, the applicants utilize various spacially orienting terms such as “upper,” “lower,” “horizontal,” and “vertical.” It is to be understood that these terms are used for ease of description of the preferred embodiments with respect to the drawings but are not necessarily in themselves limiting or requiring of an orientation as thereby described in the following Detailed Description.

DESCRIPTION OF THE PREFERRED EMBODIMENT

Figure 1A:
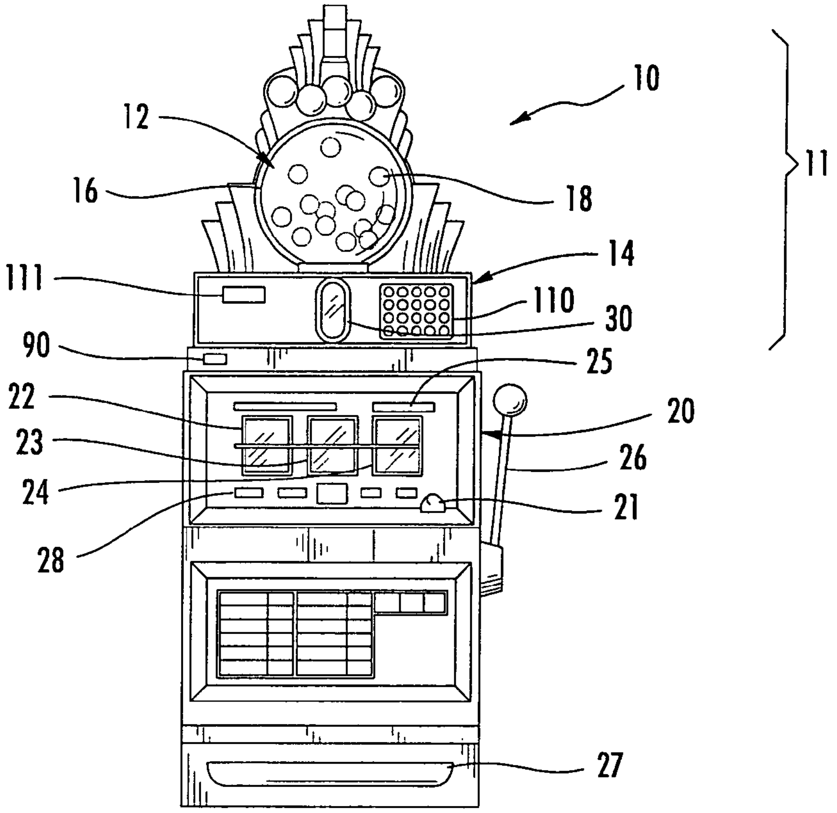
FIG. 1A is substantially a front view of the gaming device of the present invention.

As seen in FIG. 1A, one embodiment disclosed herein comprises a gaming device, generally indicated by reference number 10. Gaming device 10 comprises a display device 11 and a game apparatus 20. Display device 11 may comprise a jumbled ball display 12 and a prize display 14.

Game Apparatus

With continuing reference to FIG. 1A, game apparatus 20 may be any of a large number of devices that are adapted to allow players to play a game. For example, game apparatus 20 may utilize spinning reels 22-24 or a video display (not shown) to display outcomes of the game. Means may also be provided for accepting wagers, such as a coin slot 21 or card reader 25, and for awarding prizes, such as a coin dispenser 27. A handle 26 and button 28 are provided for activating game apparatus 20 to begin a game. In at least one preferred embodiment, game apparatus 20 may be an S Plus model gaming device manufactured by International Game Technology in Reno, Nev.

Game apparatus 20 is preferably controlled by an electronic controller 82 (see FIG. 2) that utilizes a random number generator. The random number generator produces a random or pseudo random number for each game. The outcome of the game may be determined by comparing the random number to a table of outcomes stored in a memory and accessed by controller 82. A number of different tables of outcomes may be used and different tables may be used for different games. The tables can be designed so that different prizes have different probabilities of being awarded. Such design techniques are well known in gaming. Examples of such designs are shown in U.S. Pat. No. 4,448,419, issued to Telnaes, and U.S. Pat. No. 5,456,465, issued to Durham. Controller 82 causes spinning reels 22-24 of the video display to show the outcome of the game that corresponds to the outcome of the random number generator. It is recognized that game apparatus 20 may operate in many other ways and still achieve the objects of the present invention.

Game apparatus 20 may also be capable of producing a bonus-activating event. This event may be many different types of events. For example, a bonus-activating event may comprise displaying a particular symbol, such as a "bonus" symbol, or combination of symbols, such as three "7" symbols, on reels 22-24. If the game being played is poker based, the bonus-activating event may be occurrence of a certain hand, such as a royal flush. Furthermore, a bonus-activating event may occur when a player accumulates a number of symbols or game outcomes over a number of separate game plays. For example, a bonus-activating event may occur when the player receives three "bonus" symbols during a period of time. The bonus-activating event may be based on an external event. For example, a bonus-activating event may occur when a group of players obtain a certain result.

Jumbled Ball Display

With continuing reference to FIG. 1A, jumbled ball display 12 comprises a container 16 that is adapted to hold a plurality of display balls 18. Container 16 is at least partially transparent allowing players to view display balls 18 inside of the container. Container 16 is made of a transparent material, such as plastic or glass. In the preferred embodiment, container 16 is made of acrylic. Suitable containers of this type may be obtained from Tripp Plastics of Reno, Nev. However, container 16 may also be a wire cage of a type that is used in some Keno games.

Container 16 may have many different shapes, such as a sphere, cube, cylinder, triangle, etc. In the preferred embodiment, container 16 is substantially spherical with a partially flat back (not shown). The flat back allows container 16 to be large while still allowing gaming device 10 to be placed against a wall, another gaming device, or other objects.

Although display balls 18 are preferably similar to Keno balls, many other types of balls may be used. For example, display balls 18 may be ping pong balls or rubber balls. Display 12 also comprises, an agitator (not shown in FIG. 1) to agitate or jumble display balls 18 within container 16. The agitator may be a stream of air or a mechanical mixing device. The agitator causes the balls to bounce and ricochet off of the walls of container 16. In the preferred embodiment, a stream of air is used as an agitator and container 16 comprises an off center opening for the stream of air. The opening is off center to increase the initial agitation of display balls 18.

Fins (not shown) may also be provided at the bottom of container 16 to help agitate display balls 18. The fins support display balls 18 when they are resting at the bottom of container 16. This helps air circulate underneath display balls 18 to lift and separate the balls.

The purpose of jumbled ball display 12 is to attract and entertain players. When display balls 18 are agitated, they produce a vivid display that attracts the attention of people nearby and provides an exciting display for players playing gaming device 10. Display Balls 18 are preferably kept separate from balls used in display device 14.

Figure 1B:
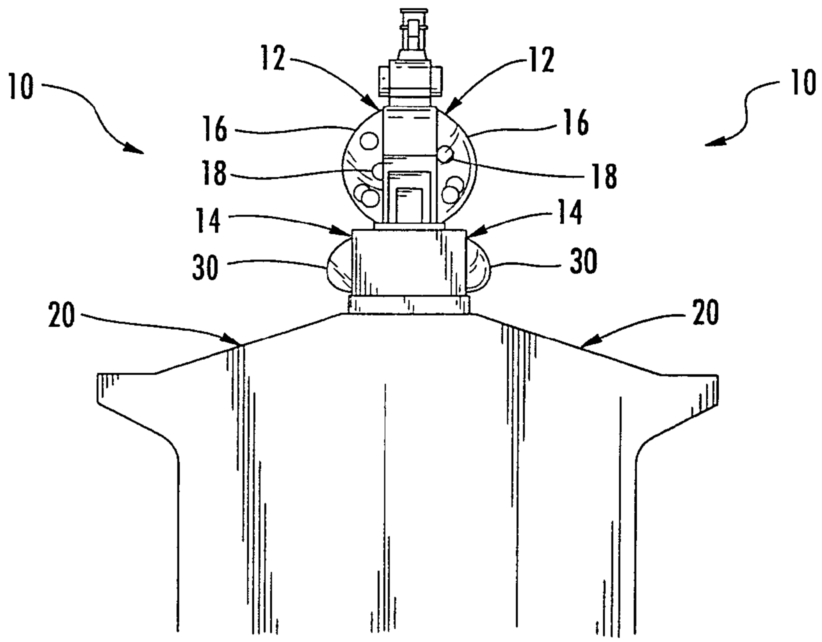
FIG. 1B is substantially a side view of an alternative embodiment of the gaming device of the present invention.

FIG. 1B represents an alternative embodiment of the present invention in which two gaming devices 10 are placed back to back. Each gaming device 10 comprises a game apparatus 20. Game apparatuses 20, shown in FIG. 1B is known as a "slant top" for their sloping upper surfaces. However, other types of gaming devices, such as the upright game apparatus 20 shown in FIG. 1A, may also be used.

In this embodiment, a separate jumbled ball display 12 is provided for each game apparatus 20. Each jumbled ball display 12 may comprise container 16 in the shape of a hemisphere. Containers 16 may be placed back to back so that the two containers have a spherical appearance when viewed from the side. Other shapes, such as cubes and cylinders, may also be used. A mirror may be placed at the back of each container 16 to enhance the appearance of the jumbled ball displays 12 by reflecting images of jumbled display balls 18 outward toward the players. Containers 16 may also be one single container that is divided in two by a mirror or other partition. Each container 16 has its own independently operated agitator and jumbled display balls 18. Each game apparatus 20 has its own independently operated prize display 14 with display window 30.

Prize Display

Referring to FIGS. 1A and 1B, prize display 14 is adapted to select a prize ball and display the ball to a player. When a bonus-activating event occurs, prize display 14 senses this, selects a prize ball, and displays the ball in a display window 30.

Figure 2A:
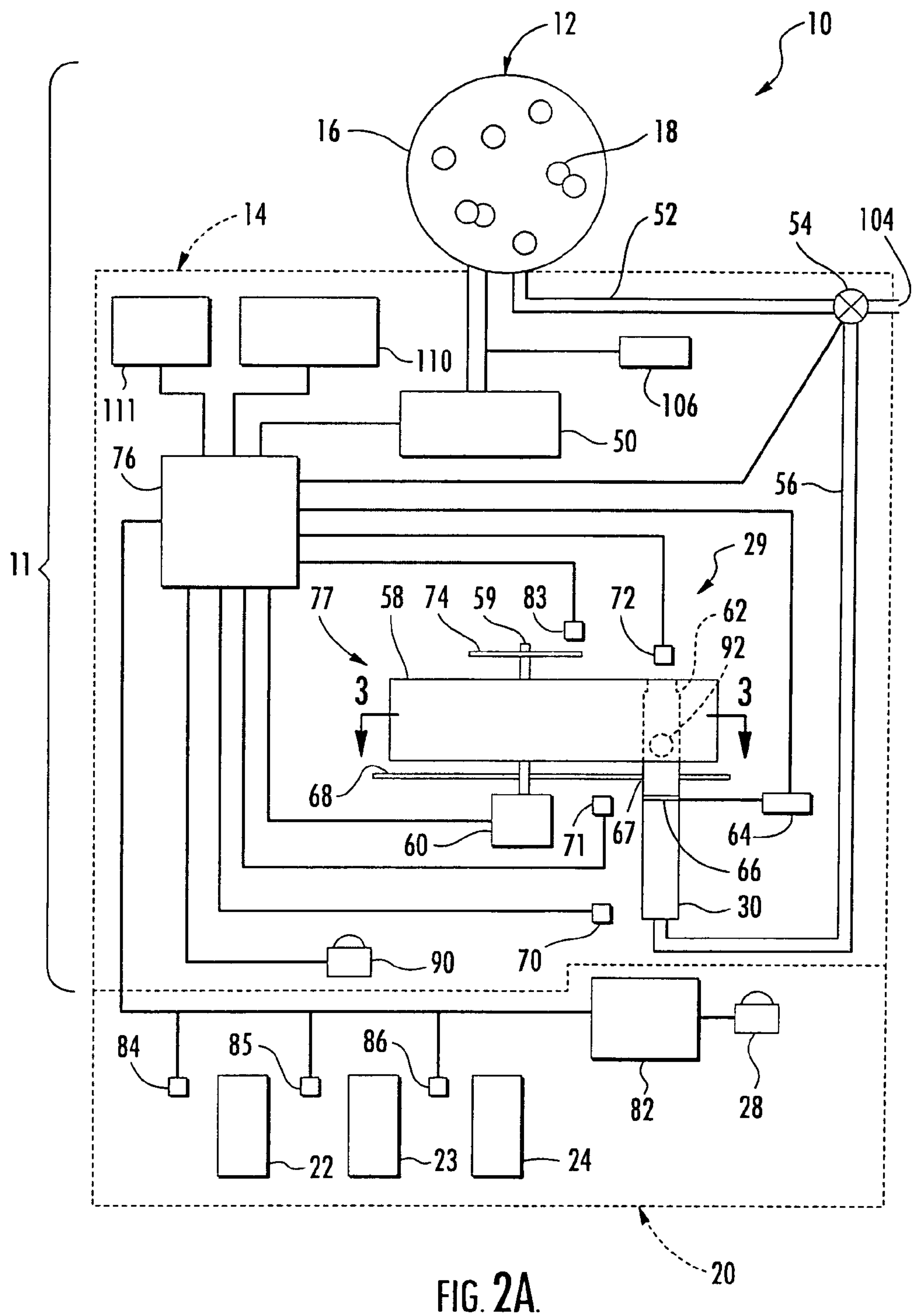
FIG. 2A is substantially a schematic diagram of the gaming device of the present invention.

Turning now to FIG. 2A, prize display 14 comprises a controller 76 that is adapted to control the operation of the device. Controller 76 may be one or more computers or processor boards. For example, in the presently implemented embodiment, controller 76 comprises a bonus controller and stepper motor controller, which may be manufactured by Progressive Solutions in Carmichael, Calif., a core module by Z-World in Davis, Calif., and a sound board by Cleverdevices in Syosset, N.Y. Other, equally suitable devices may be purchased from other manufacturers. It is recognized that controller 76 may be a single processor or processor board. Furthermore, it is also recognized that controller 76 and controller 82 may be combined in a single processor or processor board.

Controller 76 is adapted to detect when a bonus activating event occurs in game apparatus 20. This may be accomplished by game apparatus controller 82 transmitting a signal to controller 76 that a bonus event has occurred. For example, controller 82 may determine the outcome of each game and when a bonus-activating outcome occurs, it transmits a signal to controller 76. Alternatively, controller 76 may periodically interrogate controller 82. In another embodiment, one or more sensors may be provided for determining if a bonus activating event has occurred. For example, sensors 84-86 may sense the positions of reels 22-24. When reels 22-24 are in a bonus activating position, controller 76 would sense this position and begin a bonus sequence (described below). Sensors may also be provided external to gaming device 10 to detect external bonus-activating events.

Controller 82 may also transmit a variety of information to controller 76. For example, controller 82 may signal when coins or currency have been inserted, when a game starts, when an error has occurred, and when a sensor detects tampering.

When controller 76 detects a bonus-activating event, it may begin a bonus sequence by activating display 110. Display 110 may comprise many different kinds of display devices, such as video screens, lights, light emitting diodes, etc. Display 110 may comprise its own controller that is adapted to generate a variety of displays.

Display 110 may indicate that a player has qualified for a bonus round and prompt the player to perform an action. In the preferred embodiment, the player is prompted to activate the bonus sequence by pressing input device 90. Input device 90 may be a simple button, a keyboard, or a touch screen display. In the embodiment in which the player must accumulate a number of bonus symbols to qualify for a bonus, display 110 may indicate the number of symbols the player has received.

When controller 76 detects input device 90 being activated, the controller would activate the agitator in jumbled ball display 12. In the preferred embodiment, the agitator comprises blower 50, which blows air into container 16. Alternatively, the agitator may begin automatically and input device 90 may be used to initiate the display sequence. In another embodiment, controller 76 may wait a predetermined time period for the player to activate input device 90. If the player does not activate input device 90 in that time period, controller 76 would automatically activate the display 12 and initiate the display sequence. In yet another embodiment, controller 76 automatically initiates the display sequence in a predetermined time period, independent from input device 90, and input device 90 is only used to activate the jumbled ball display 12. Of course, no input device may be used and controller 76 may automatically activate display 12 and begin the display sequence.

To display a prize ball, controller 76 performs a routine to determine which ball will be displayed. This may be performed by a number of methods that are well known in the art. For example, prize balls 92 may be sequentially displayed or displayed based on external events, such as certain bonus activating events may always cause the same prize ball to be displayed.

In the preferred embodiment, however, prize balls 92 are randomly selected. Controller 76 generates a random number and then compares the random number to a pay table similar to that described for game apparatus 20 or as described in U.S. Pat. No. 5,823,874, issued to Adams. A simple pay table may appear as follows:

TABLE 1

| Random Number | Prize Ball Number | Amount Paid |
|---|---|---|
| 0.00 to 0.50 | 1 | $10.00 |
| 0.51 to 0.75 | 2 | $5.00 |
| 0.76 to 0.95 | 3 | ×2 |
| 0.96 to 1.00 | 4 | $1,000.00 |

For example, if the random number generator produced 0.65, prize ball number 2 would be displayed and $5.00 would be awarded to the player. If the random number generator produced 0.80, prize ball number 3 would be displayed. Prize ball number 3 is a multiplier ball that multiplies some amount produced by game apparatus 20. Gaming apparatus 20, for instance, may award $20 and the multiplier ball would multiply this by two, awarding the player $40.

This embodiment is not necessarily limited to the example pay table shown. A greater number of prize balls may be used and, as will be discussed below, a combination of prize balls may be displayed. Furthermore, different kinds of prizes, besides monetary prizes, may be awarded. For example, the prizes may be goods, services, or additional games. The goods and services may be awarded in the form of physical objects, tickets, vouchers, coupons, etc. Additional games may be presented in the form of tickets, such as scratch off lottery tickets. In the embodiments in which tickets, vouchers, and coupons are used, the objects are dispensed using an internally or externally mounted dispenser 111. Such dispensers are well known in the art.

Once controller 76 determines the prize ball to be displayed and the prize to be awarded, the controller activates a positioning mechanism 77. Positioning mechanism 77 is adapted to position a selected prize ball (that is separate from display balls 18) so that it can be displayed. Positioning mechanism 77 may utilize a large variety of devices to achieve its purpose. In the preferred embodiment, all of the prize balls are held in a ball holder 58. Ball holder 58 may be made from a variety of materials, such as plastics, metals, or composites. In one embodiment, ball holder 58 is cast high-density urethane foam that is machined to obtain a precise shape. In the preferred embodiment, ball holder 58 is injection molded plastic.

Prize balls 92 preferably have a similar appearance to display balls 18 in container 16. This creates the illusion that balls displayed in display window 30 originate from container 16. At least one of prize balls 92 have a symbol that is capable of indicating a prize to be awarded to the player.

Prize balls 92 are stored in ball holder 58 in an individually controlled manner so that individual balls can be selectively removed from the ball holder. This allows particular balls with particular symbols or values to be individually manipulated and displayed when desired. This may be accomplished in different ways. In the preferred embodiment, ball holder 58 comprises a chamber 62 for each prize ball 92 stored in the holder. A display mechanism 29 is provided for removing ball 92 stored in chamber 62, displaying the ball, and replacing it in the chamber.

Figure 3:
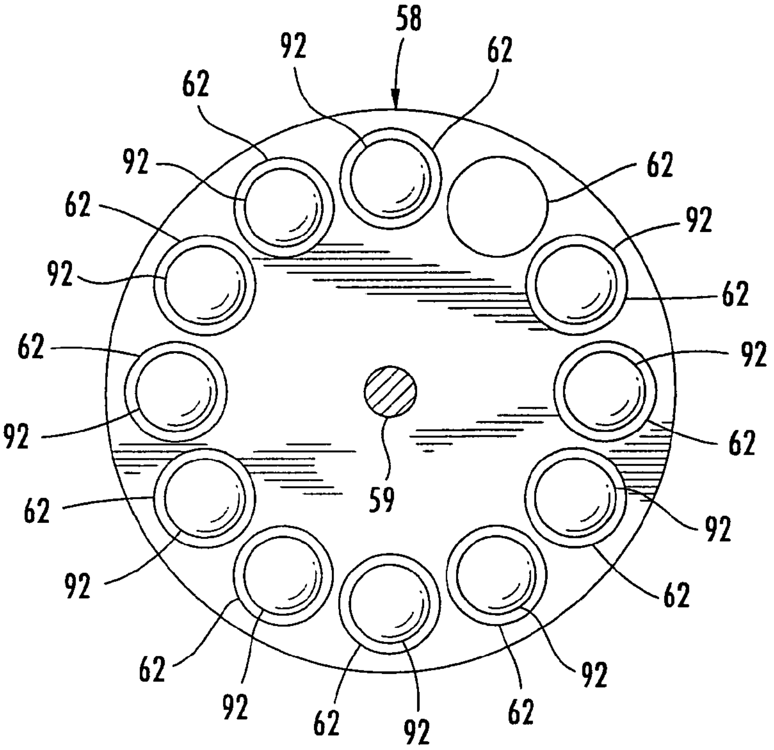
FIG. 3 is substantially a top cross sectional view of the preferred ball holder of the present invention taken along line III in FIG. 2.
Figure 4:
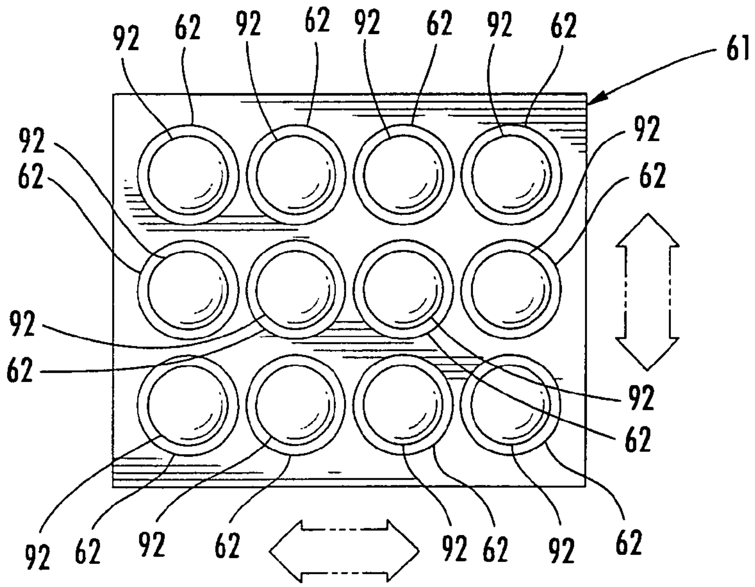
FIG. 4 is substantially a top cross sectional view of an alternative ball holder of the present invention.

In the preferred embodiment, ball holder 58 is cylindrical as illustrated in FIG. 3. Chambers 62 are positioned outward from a central axis 59 of ball holder 58, near the periphery of the holder. Thus, chambers 62 may be positioned by rotating ball holder 58 around its central axis 59. Ball holder 58 may be provided in different configurations. For example, as shown in FIG. 4, ball holder 61 may be square or rectangular with chambers 62 arranged in rows and columns. In this embodiment, controller 76 is programmed with the location of chambers 62 and ball holder 61 is positioned by moving it laterally and longitudinally. Stepper motors and gears may perform the lateral and longitudinal positioning (not shown).

Returning to FIG. 2A, positioning mechanism 77 comprises a stepper motor 60 for rotating holder 58. Wheel 74, rigidly attached to holder 58, and sensor 83, not attached to the holder, are provided for determining the angular position of the holder. Thus, controller 76 can position a ball 92 in holder 58 where it can be removed and replaced by rotating the holder and monitoring its angular position. The angular position of each prize ball 92 is stored in memory in controller 76. Sensor 83 may be an infrared source and detector and the periphery of wheel 74 may comprise portions with different reflective characteristics, such as physical holes or gaps or absorbent paint lines. Alternatively, an optical flag configuration similar to that described in U.S. Pat. No. 4,911,449, issued to Bertram, may be used.

Figure 5A:
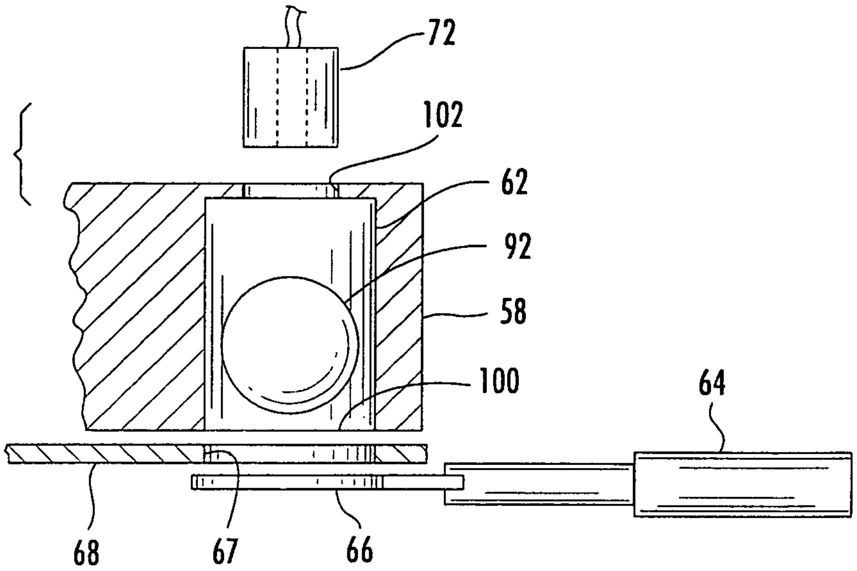
FIG. 5A is substantially an enlarged view of the ball holder shown in FIG. 2.

In the preferred embodiment, holder 58 is arranged to allow the force of gravity to remove balls 92 from the holder. Referring now to FIGS. 2A and 5A, each chamber 62 has a lower opening 100 that is large enough for prize ball 92 to pass through. A plate 68 is provided on the lower surface of holder 58 for preventing prize balls 92 from falling out of chambers 62. A hole 67 is provided in one portion of plate 68 for allowing ball 92 to pass through the plate. A gate 66 blocks ball 92 until it is opened by an actuator 64. Gate 66 may cover the entire hole 67 or just a portion of it and it may be operated in a sliding or hinged manner. Actuator 64 may be an electrical solenoid actuator.

Figure 5B:
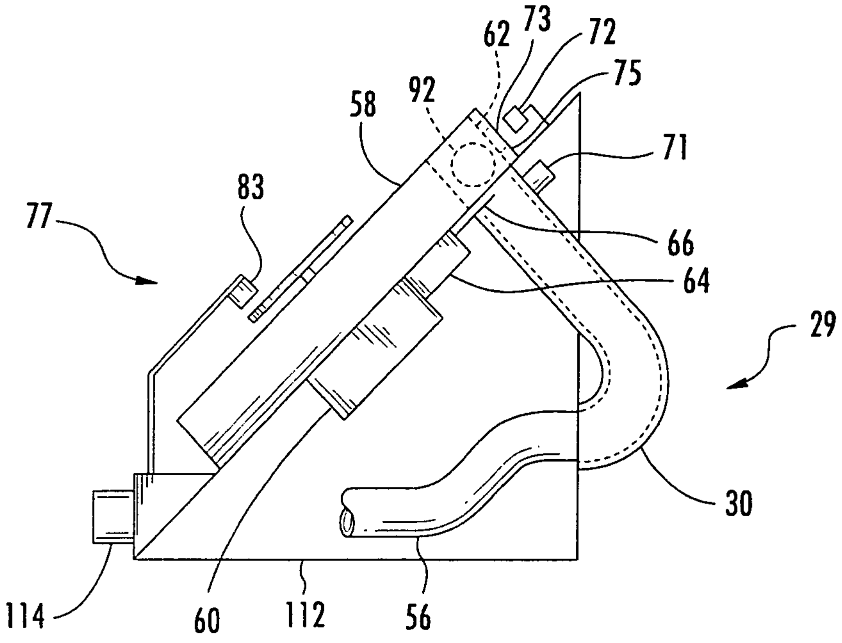
FIG. 5B is substantially a side elevational view of the positioning and display mechanisms of the preferred embodiment of the present invention.

FIG. 5B represents a preferred embodiment in which a chassis 112 supports ball holder 58 at approximately a forty-five degree angle to the vertical. Mounting grooves (not shown) may be provided in prize display 14 for slidably receiving chassis 112 and connector 114 may be provided for connecting electrical circuits and devices to power supplies and controller 76. One of the advantages of this embodiment is that positioning mechanism 77 and display mechanism 29 can be easily serviced by removing chassis 112 from prize display device 14.

Referring to FIGS. 2A and 5A, in normal operation, after controller 76 has determined which ball is to be displayed, the controller rotates holder 58 until the desired prize ball 92 is positioned over the plate hole 67. At the appropriate time, controller 76 activates actuator 64 to open gate 66. The force of gravity then pulls prize ball 92 downward through hole 67 into display window 30. Display window 30 may be a chamber with a transparent or partially transparent wall that allows the player to see selected prize ball 92. In the preferred embodiment, display window 30 comprises a tube that projects outward from the front surface of prize display device 14. This allows players to view prize ball 92 from many different angles and see symbols on the ball. Sensors 70 and/or 71 may be used to verify that prize ball 92 has fallen into display window 30. If sensors 70 and/or 71 do not detect ball 92 in its proper position, controller 76 may enter an error mode.

If the ball is detected in its proper position, controller 76 may cause display 110 to display the prize, if any, that the player has won. Other effects may also be presented, such as pre-recorded sound from speakers. If the actual prize is money, the amount of the prize may be added to the player's credit meter or the prize may be dispensed from dispenser 111 or coin dispenser 27.

After ball 92 has been displayed long enough, controller 76 operates a valve 54 to divert exhaust air from container 16. While blower 50 is in operation, air is allowed to escape container 16 through an exhaust duct 52. Valve 54 is used to divert air from a vent 104 to a display duct 56. Display duct 56 directs air to the bottom of display window 30 where it blows the ball 92 upwards back into chamber 62. An upper opening 102 is provided in chamber 62 for allowing air to escape from the chamber thereby producing an air current. Sensors 72 and/or 71 may be used to verify that ball 92 has returned to chamber 62. If the ball is not detected in its proper position, controller 76 may enter an error mode and an attendant is called. In the preferred embodiment, shown in FIG. 5B, sensor 72 is placed next to the peripheral wall 75 of ball holder 58 and a hole 73 is provided in the peripheral wall next to each chamber 62.

It is recognized that the components of the present invention may be arranged alternatively so that ball display window 30 is located above holder 58 and ball 92 is blown upwards into the display. When valve 54 is closed, the force of gravity pulls ball 92 back into chamber 62. In this alternate embodiment, once ball 92 has returned to chamber 62, controller 76 closes gate 66 by activating actuator 64, turns off blower 50, and waits for the next activating event.

A power failure or power surge could cause actuator 64 to malfunction and improperly open gate 66 while prize display 14 is idle. This would cause prize ball 92 to fall out of chamber 62 into display window 30, thereby giving a false indication that the player had won a prize. In order to prevent this, in the preferred embodiment, at least one chamber 62 does not have prize ball 92 (see FIG. 3). This empty chamber is positioned over hole 67 whenever prize display 14 is idle.

Because some balls are very light, static electricity can cause the balls to stick to each other and to other components. To prevent this, a variety of static discharge devices 106 may be placed in various locations in the present invention. In the preferred embodiment, static discharge device 106 is a bare stranded copper wire with its strands spread out. The wire is placed in the flow of air between agitator 50 and container 16 and wire is attached to a common ground.

Prize display 14 of the present invention may also comprise means for simultaneously displaying a plurality of balls 92. To accomplish this, plate 68 may have multiple holes 67 (not shown), each with its own gate 66 and actuator 64, for supplying balls to multiple display windows. Thus, holder 58 may be positioned so that the appropriate ball is positioned over the appropriate hole 67 for supplying the appropriate display window 30. Alternatively, a plurality of ball holders 58 may be provided, each one supplying balls to a separate display window 30.

Figure 6:
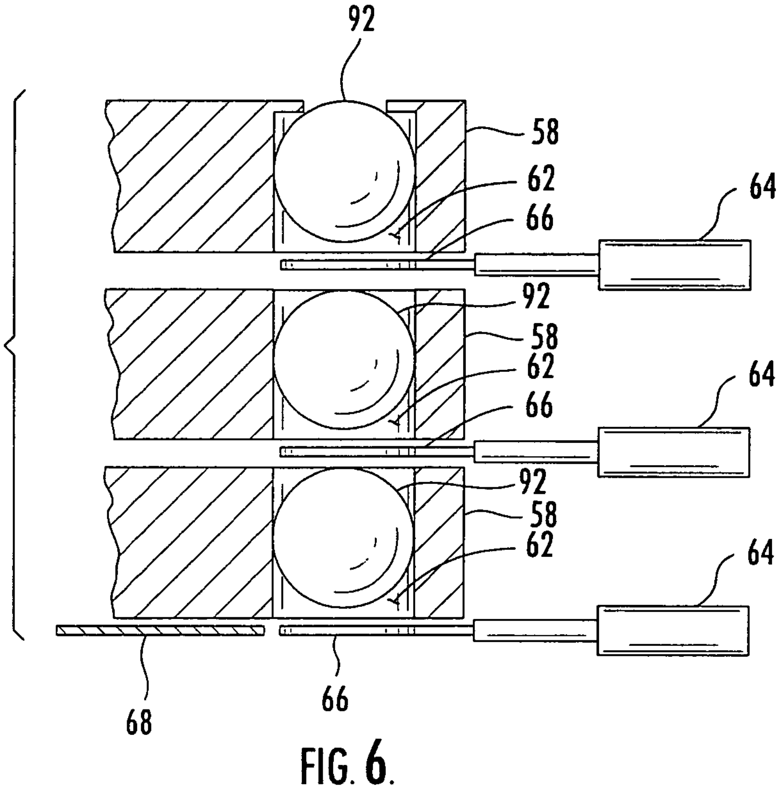
FIG. 6 is substantially a schematic diagram of an alternative embodiment of the present invention using multiple stacked ball holders.
Figure 7:
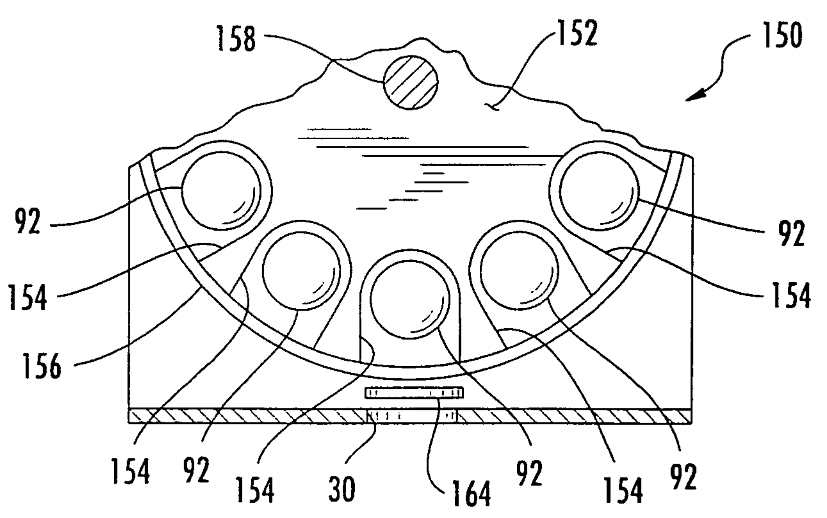
FIG. 7 is substantially an alternative display mechanism of the present invention.

In yet another embodiment, seen in FIG. 6, a plurality of separately controlled ball holders 58 are arranged in a stack. Each ball holder 58 is rotated to a position so that chambers 62 are aligned above display window 30 (FIG. 7). Gates 66 are then opened and balls 92 are allowed to fall into display window 30. In this embodiment, display window 30 is large enough to display three balls simultaneously. When the display period has ended, balls 92 are blown back into chambers 62 and gates 66 are closed to separate and contain the balls. The action of gates 66 separates prize balls 92 into separate chambers 62.

With multiple balls being displayed, it is possible to use combinations of balls to indicate various bonus outcomes. It is also possible to replace the primary display of a gaming device with selector and prize display device 14. In other words, game apparatus 20 may be entirely replaced with selector and prize display device 14.

As seen in FIG. 7, the present invention comprises an alternative display mechanism 150. Display mechanism 150 comprises a cylindrical ball holder 152 that may be rotated around its central axis 158. Ball holder 152 comprises a plurality of chambers 154 positioned along the periphery of the holder, each chamber is adapted to hold ball 92. Unlike the embodiment described in FIG. 2, it is not necessary to remove and replace balls 92 from chambers 154. Instead, at least a portion of the outer wall of each chamber 154 comprises a transparent material that allows players to view balls 92 inside the chamber. The transparent wall may comprise a ring of transparent material 156 that surrounds holder 152. A shutter device or door 164 may be provided between display window 30 and holder 152 for blocking the view of players while the holder is rotated. Although this embodiment has the advantage of a simpler mechanism, it may be less entertaining to players because it may be more apparent to the players that balls 92 do not originate from jumbled ball display 12 (FIG. 1A).

Figure 1C:
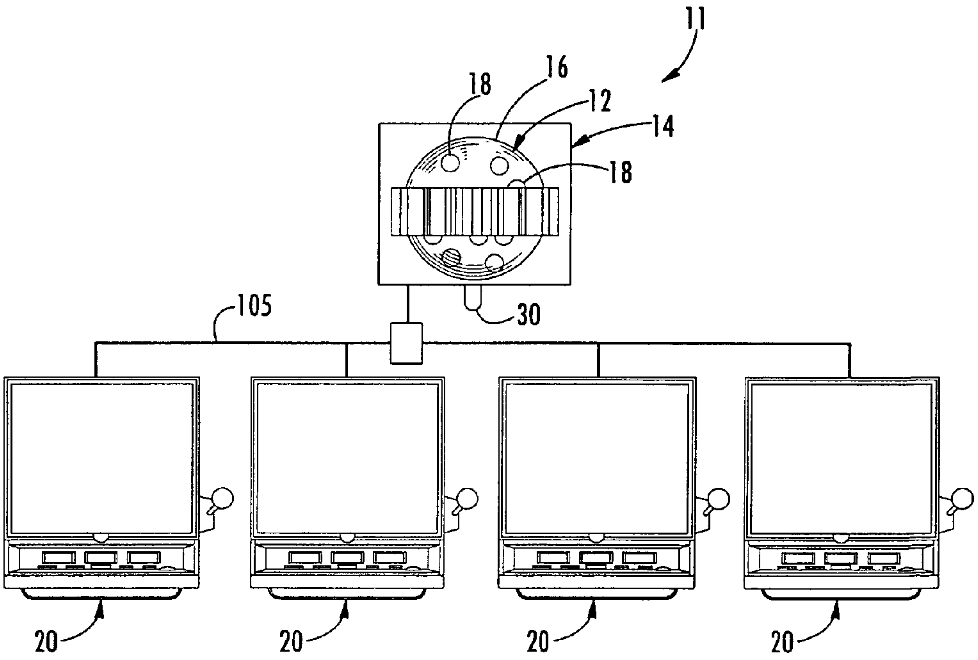
FIG. 1C is substantially a top schematic diagram of the display device of the present invention in use with a plurality of display apparatus.

As seen in FIG. 1C, a single display device 11 may also be used with a plurality of game apparatus 20. In this embodiment, each game apparatus is in communication with display device 11 by a communication device 105. Communication device 105 may be a network cable, such as an Ethernet cable, and appropriate hardware, such as network interface cards, may be included in display device 11 and game apparatus 20. When one of the game apparatus 20 produces a bonus-activating event, a signal is sent to display device 11. A prize ball may then be selected and displayed as described above.

Figure 2B:
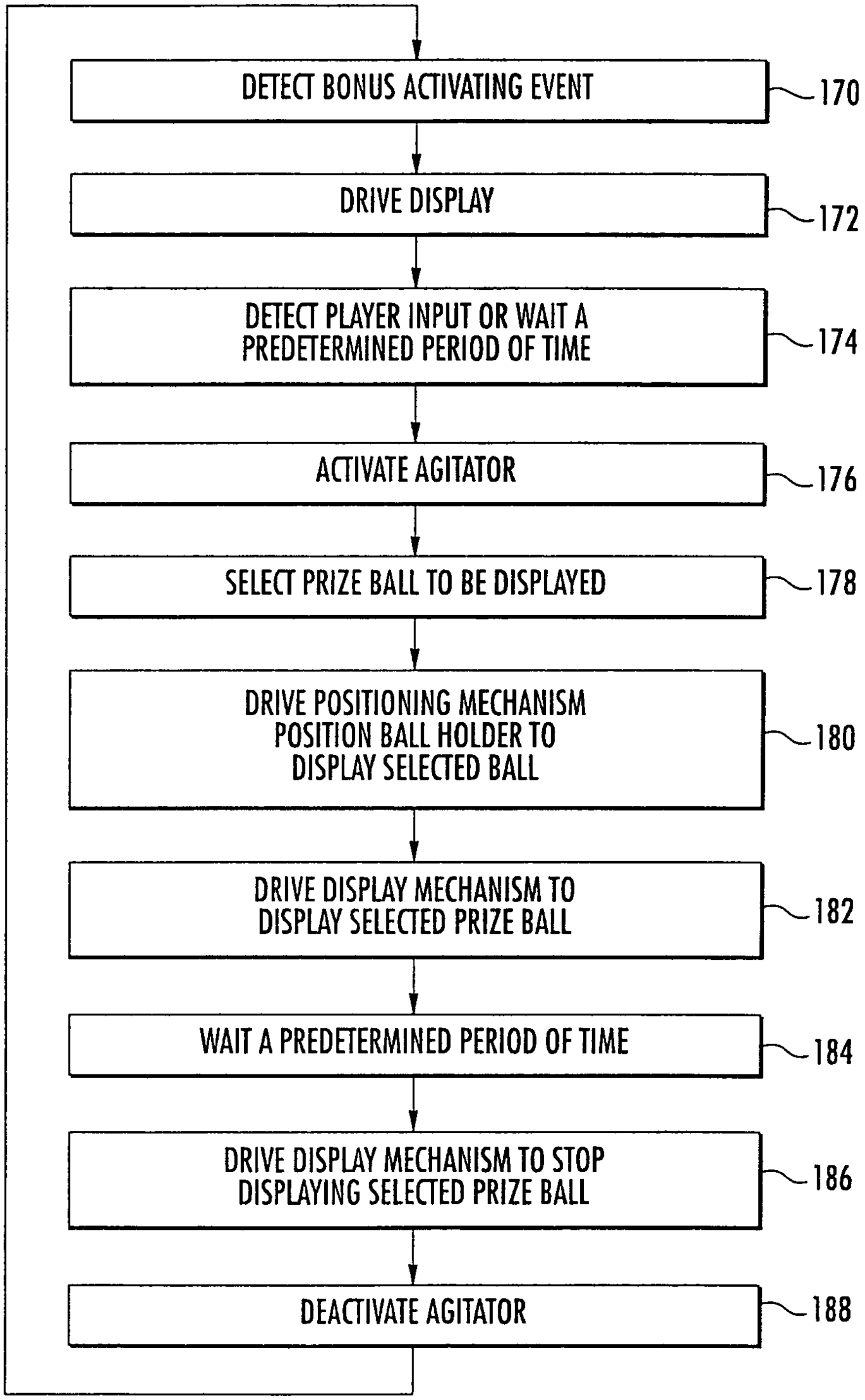
FIG. 2B is substantially a flow chart of the operation of the display device of the present invention.

Turning now to FIG. 2B, the operation of prize display 14 begins when controller 76 detects a bonus-activating event 170. Controller 76 may then drive display 110 to display an appropriate presentation or message 172. As discussed above, controller 76 may wait for player input from input device 90 or it may wait for a predetermined period of time 174. At some point, controller 76 activates the agitator 176 and selects a prize ball to be displayed 178 from ball holder 58. Controller 76 then drives positioning mechanism 77 to position ball holder 58 so that the selected prize ball may be displayed 180 and causes display mechanism 29 to display the selected ball 182. Controller 76 may then wait a predetermined period of time so that the player may see the displayed prize ball 184, after which it causes display mechanism 29 to stop displaying the selected prize ball 186. The agitator is then deactivated 188 and controller 76 returns to a monitoring state to detect the next bonus activating event 170.

Bingo

Figure 8:
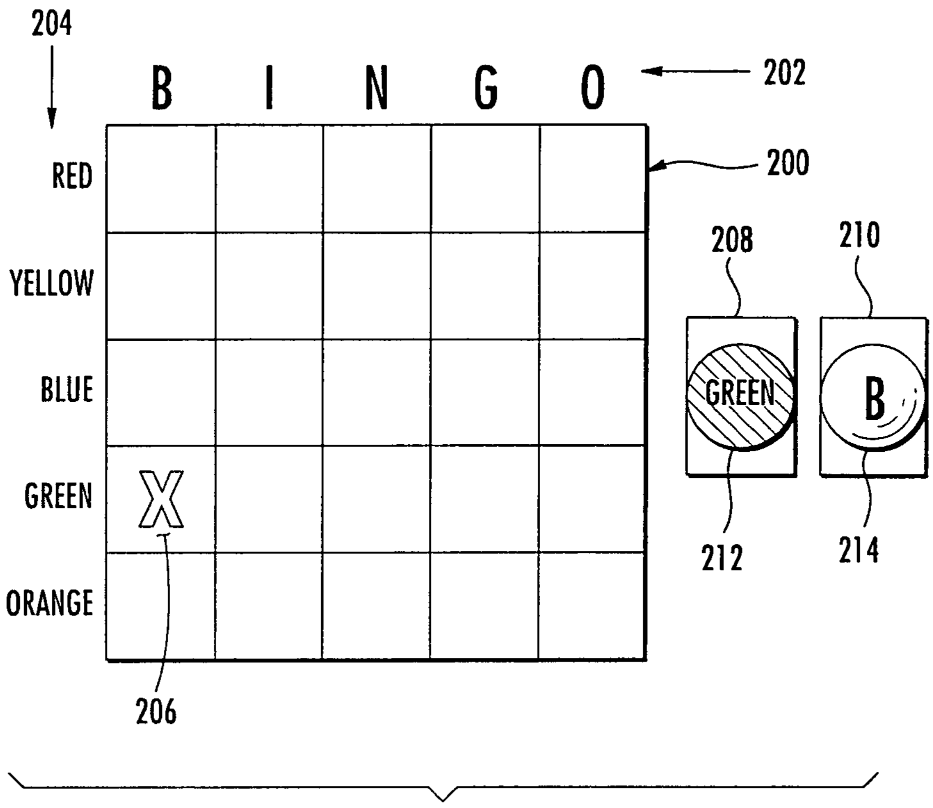
FIG. 8 is substantially a schematic representation of a bingo game that may be used with the present invention.

A number of games have been developed to take advantage of the unique features of the present invention. As seen in FIG. 8, one of the games of the present invention comprises a bingo card 200 that may be displayed by a display device, such as an LCD, LED, CRT, or backlit translucent material. The horizontal axis of the card may comprise alphabetic or numeric characters 202 and the vertical axis of the card may comprise colors 204. The alphanumeric characters and the colors may be randomly arranged for each new game, thereby adding variety to the game.

In the Bingo embodiment, prize display 14 comprises two display windows 208 and 210. Each display window 208 and 210 may have its own individual ball holder 58 and prize balls 92 (not shown in FIG. 8). Ball display 208 corresponds to the vertical axis with balls 212 therein displaying colors and ball display 210 corresponds to the horizontal axis with balls therein displaying alphabetic or numeric characters.

In this game, the player wins a bonus prize by filling all of the spaces in a row, column, diagonal line, or combination of rows, columns, and diagonal lines with a symbol. For example, when the player qualifies for a bonus award, prize display 14 may randomly select and display a green ball 212 and a ball 214 with the letter "B" on it. A symbol 206 may then be displayed in the space where the "B" column and the green row intersect. Play would continue in this way until the player wins a prize. Once a prize is won, card 200 may be cleared so that the bonus game may be replayed.

Figure 9:
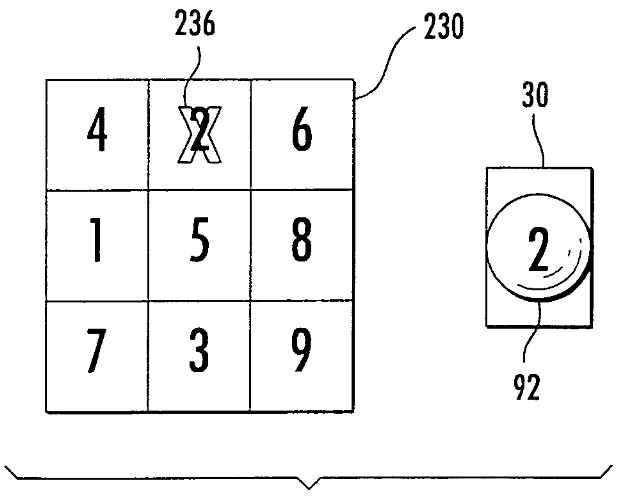
FIG. 9 is substantially a schematic representation of an alternative bingo game that may be used with the present invention.

An alternative embodiment of the Bingo bonus game is disclosed in FIG. 9. In this embodiment, a bingo card 230 displays a plurality of symbols. The symbols may be randomly arranged on card 230 for each game. When display window 30 displays a ball 92, displaying a symbol thereon, a symbol 236, such as an "X," is placed on the corresponding space on bingo card 230.

Figure 10:
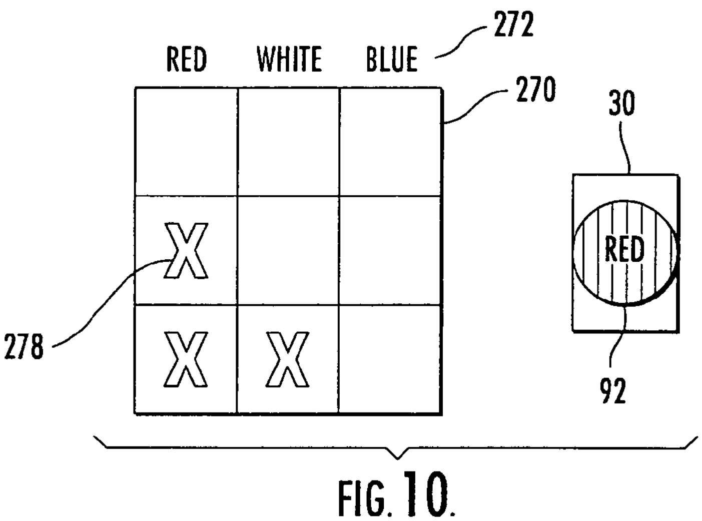
FIG. 10 is substantially a schematic representation of an alternative bingo game that may be used with the present invention.

In another embodiment, shown in FIG. 10, card 270 is divided into a plurality of columns. Each column corresponds with a particular type of symbol or color. The columns preferably have labels 272 on a horizontal axis. As prize display 14 displays a ball 92 in display window 30, a symbol 278 is placed in a space in the column that corresponds to the symbol on the ball. In this embodiment, the player is awarded a prize when all of the spaces in at least one column are filled. Card 270 is then cleared so that play can repeat.

Of course, many different variations of the Bingo bonus game may be utilized with the present invention. For example, larger or smaller cards and different symbols or combination of symbols may be used with the invention.

Lottery

Figure 11:
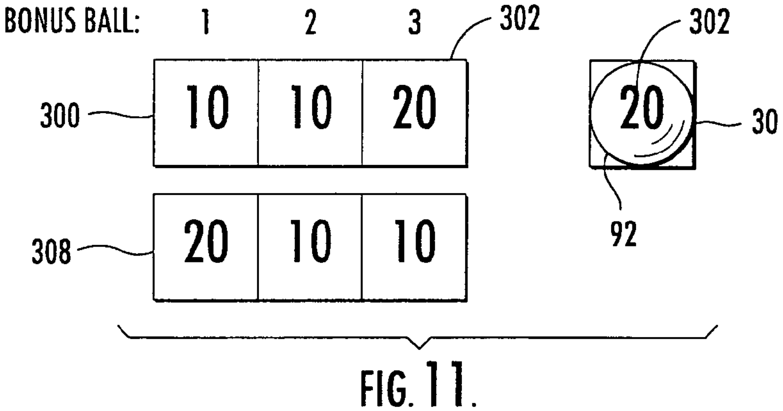
FIG. 11 is substantially a schematic representation of a lottery style game that may be used with the present invention.

An embodiment may provide a game that follows a format similar to a lottery game. In this embodiment, seen in FIG. 11, prize ball 92 is selected and displayed in display window 30 in the same manner as other embodiments discussed above. Each time a ball is selected, a symbol 302 on the prize ball 92 is recorded in a first symbol display 300. In the example shown in FIG. 11, the number "10" has been recorded in the first and second areas for balls that have been previously selected and the number "20" is displayed in the third area for the most recent ball 92 selected. A second symbol display 308 is provided for displaying a randomly selected set of numbers. The numbers displayed in second display 308 may be generated with a random number generator that is adapted to select only the numbers that may be displayed on prize balls 92. Alternatively, similar to well known lottery games, the player may be allowed to pick the numbers in display 308. Of course, a greater or lesser number of spaces may be provided in displays 300 and 308.

In the preferred lottery embodiment, the player is paid the amount shown on each prize ball 92 as it is displayed. Thus, in the example in FIG. 11, the player would be paid 20 credits or dollars for number 302 that is presented on the currently displayed ball 92. In addition to the prize displayed on ball 92, the player may qualify for an additional amount if the symbols displayed in first symbol display 300 are the same as the symbols displayed in second symbol display 308. In one embodiment, the symbols in first symbol display 300 must be in the same order as the symbols displayed in second symbol display 308. Thus, in the example shown in FIG. 11 the player would not win a prize because the order of the numbers are not the same. In another embodiment, the order of the numbers is irrelevant. Thus, in the example shown in FIG. 11 the player would win a prize because the symbols in first symbol display 300 are the same as the symbols in second symbol display 308. A modified version of the second embodiment would award a larger prize to the player if the order of the numbers in the two displays 300 and 308 were the same. In yet another embodiment, the prize that is awarded to a player is a progressive jackpot of a type that is well known in the art.

Player Selection

Figure 12:
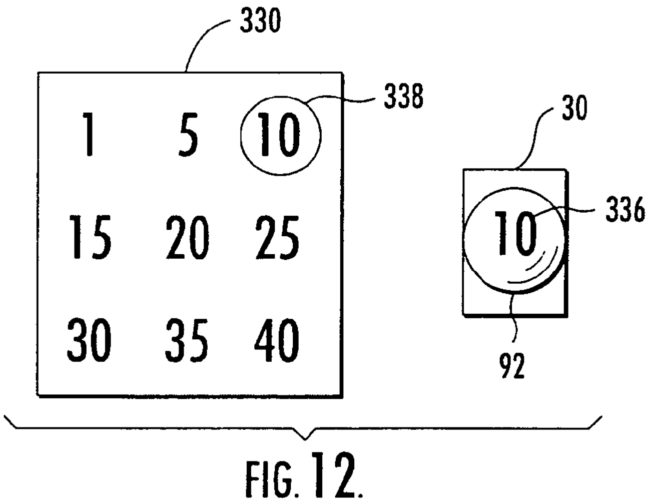
FIG. 12 is substantially a schematic representation of a player selection game that may be used with the present invention.

In another embodiment, the player selects a symbol or symbols from a list of symbols that the player may receive. Illustrated in FIG. 12, a display device 330 may be provided that displays a plurality of different symbols. When the game begins, the player may be prompted to select one of the possible symbols. In the case of a touch screen, the player may select the symbol by pressing the symbol with the player's finger. Other selection devices, such as buttons, may also be used. A graphical indicator may be used to indicate that the symbol has been selected, such as a circle 338 around the symbol. Once the symbol has been selected, the prize display 14 selects a prize ball and displays it in display window 30. If a symbol 336 on ball 92 matches the symbol selected by the player, the player is awarded a prize. In an alternative embodiment, the player is awarded the prize shown on the ball and the player receives an additional prize if the symbol on the ball matches the symbol selected by the player.

The player selection embodiment of the present invention may be combined with the lottery embodiment of the present invention. In this combination, the player is asked to select a plurality of numbers. If the symbols on the balls selected by prize display 14 are the same as the symbols selected by the player, the player is awarded a prize.

One of the advantages of providing the games discussed above is to increase the excitement and enjoyment of playing gaming device 10. Not only are the games entertaining to view, but they also increase the excitement and enjoyment experienced by players by offering large prizes. Each of the games can be adapted to award large prizes because they are capable of producing low probability events from which the large prizes are awarded.

In addition, the games may be adapted for use as the primary game. Thus, game apparatus 20 may be completely replaced with the games of the present invention.

Video Display Embodiment

Figure 13:
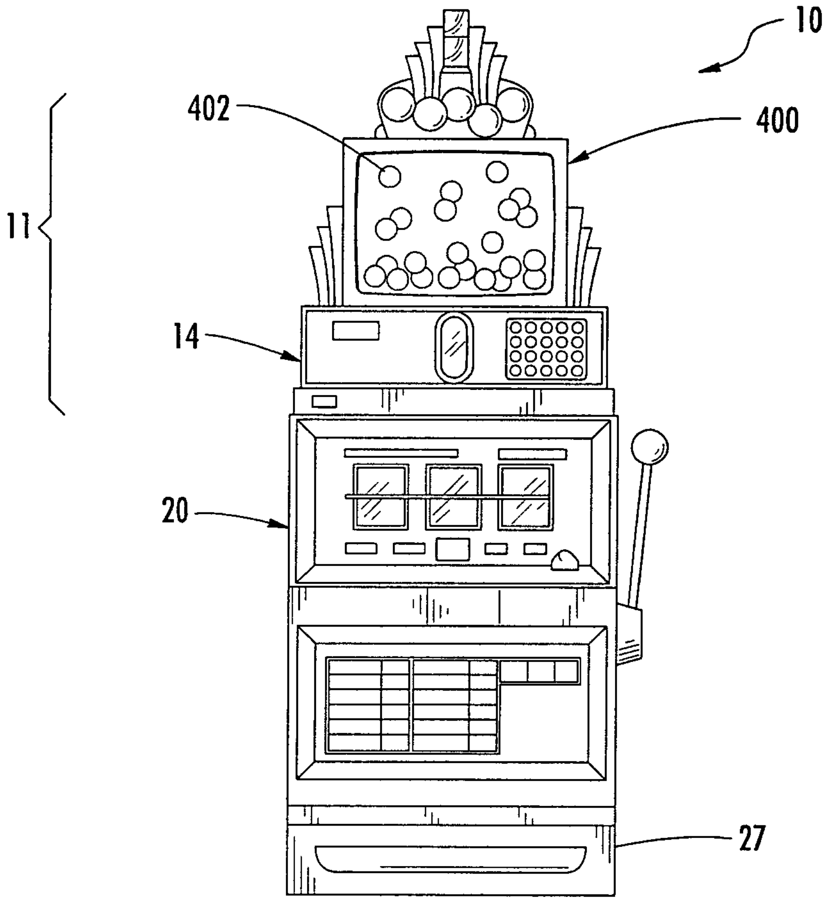
FIG. 13 is substantially a front view of the gaming device of the present invention utilizing a video display device.

As seen in FIG. 13, an alternative embodiment that utilizes a video display device. In this embodiment, jumbled ball display 12 (see FIG. 1) is replaced by video display device 400. Video display device 400 presents an image of display balls 402 that is shown to the player. Video display device 400 may be any of a large number of display devices that are well known in the art. For example, video display device 400 may be a cathode ray tube of a type that is used with many personal computers.

Video display device 400 is in communication with controller 76 (see FIG. 2A). Controller 76 transmits messages to video display device 400 to request the display device to produce different displays. For example, controller 76 may send a signal to video display device 400 when a bonus activating event has occurred to show balls 402 in an agitated state. After a bonus ball is selected and displayed, controller 76 may send another signal to video display device 400 to show the balls returning to a resting state.

Video display device 400 may comprise a video controller (not shown) that drives the display device to present various displays. Many different well-known video controllers may be used. Software and data used to produce different presentations may be stored on the video controller in non-volatile memory, such as compact disks, magnetic disk drives, or erasable programmable read only memory (EPROM).

Of course, video display device 400 may display other information in graphic and text form, such as instructions on how to use gaming device 10. Speakers may also be provided for presenting audio information, such as the sound of agitated balls or music when a prize is won.

This video display embodiment has the advantage of reducing maintenance because the moving parts of the jumbled ball display are eliminated. This embodiment also provides greater flexibility because many different kinds of presentations may be displayed on the video display device 400.

Gaming device 10 disclosed in FIG. 13 utilizes video display device 400 in place of jumbled ball display 12, but prize display 14 is provided to select and display physical prize balls, which may be adapted to appear to originate from the video display device. However, it is recognized that video display device 400 may be used in place of prize display 14 as well. In this embodiment, video display device 400 could display a prize ball that appears to be randomly selected from the agitated display balls.

Game Board Embodiment

Figure 22:
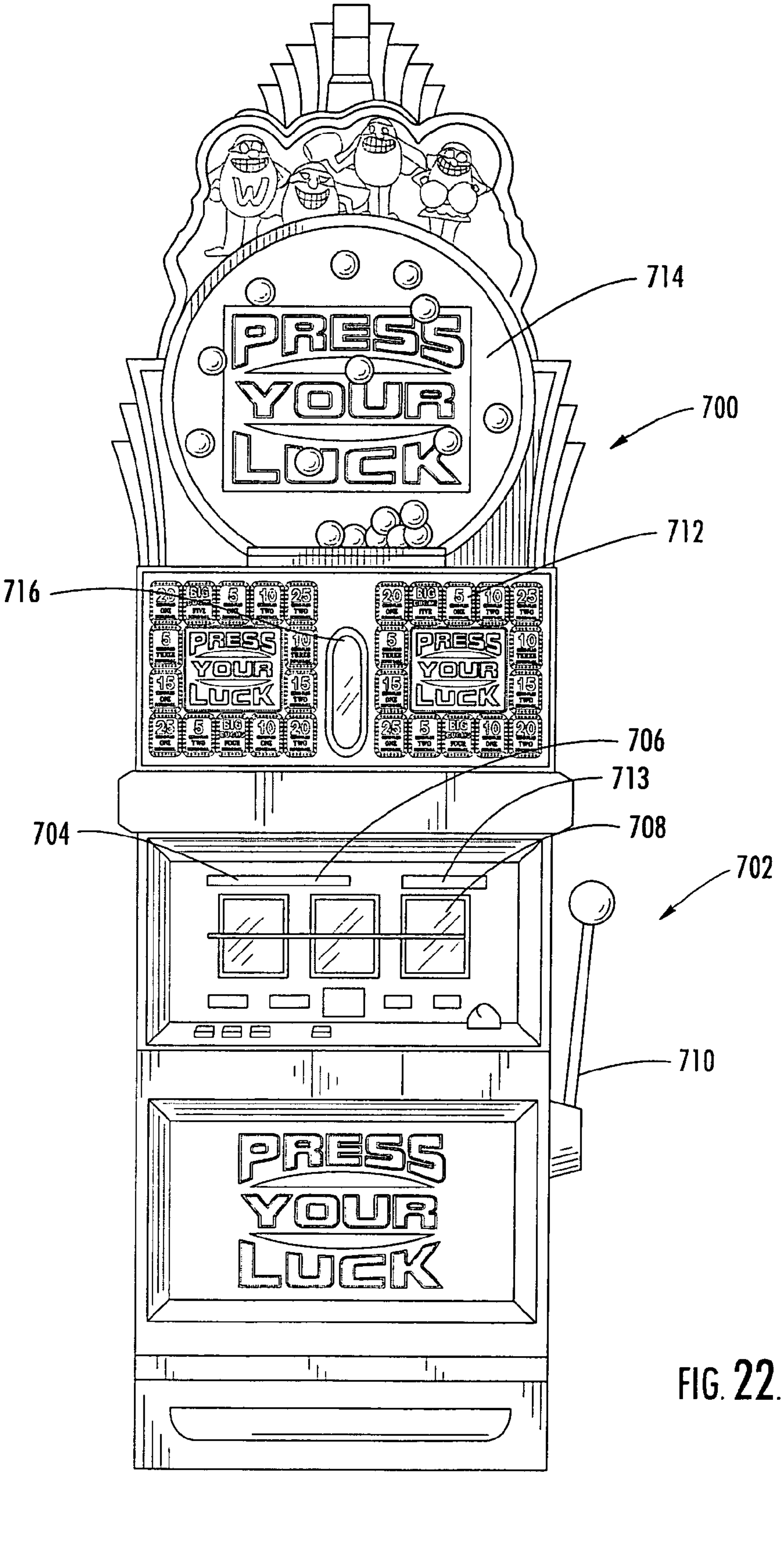
FIG. 22 is substantially an alternative gaming machine including a game board providing a bonus opportunity to game players when they procure particular outcomes in base games-of-chance, such as the reel base game on the gaming machine of this embodiment.
Figure 24:
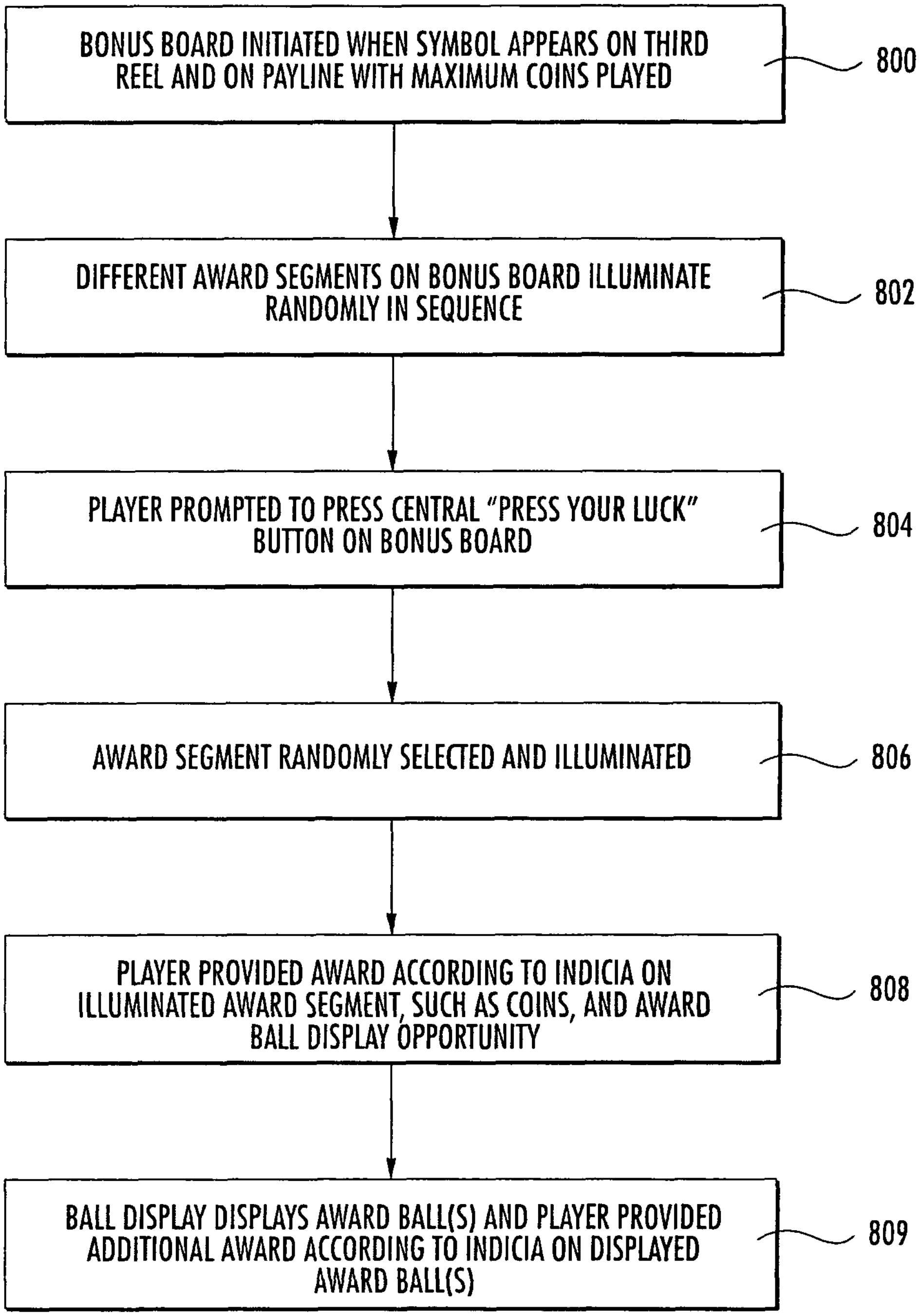
FIG. 24 is substantially a flow chart showing the method of operation of the game board and underlying preferred base reel game.

With reference now to FIGS. 22 and 24, in yet another embodiment, a gaming machine, generally 700, includes a base game-of-chance such as a reel game, generally 702, with reels 704, 706, 708 and a base game activation mechanism such as a base game activation arm 710. The gaming machine 700 also includes a jumbled ball or action unit display or container 714, a bonus ball positioning mechanism (not shown in FIG. 22; see, e.g., 77 in FIG. 2), and a prize display device 716, all of which may be configured as described above in other embodiments shown above or below. The gaming machine 700 further includes a bonus display in the form of one or more game boards, e.g., 712.

The reels 704, 706, 708 may be actual physical reels or video simulated reels, for example. The reels 704, 706, 708 provide gaming symbols to indicate gaming outcomes from the rotation, or apparent rotation and termination of such rotation of the reels 704, 706, 708. Upon the occurrence of one more preferably predetermined gaming outcomes in the base reel game, 702, the gaming machine makes the bonusing game board 712 available to the game player, in order to offer the game player an opportunity to procure an award or bonus beyond or in addition to any award, credit, etc., provided to the player in the base reel game 702. In the preferred embodiment, this bonusing opportunity (to play the bonusing board game 712) is made available to the player when the rightmost (conventionally referred to as the "third") reel 708 displays "Press Your Luck" indicia in the reel outcome viewing window 713 for that particular reel 708 (see 800 in FIG. 24).

Figure 23:
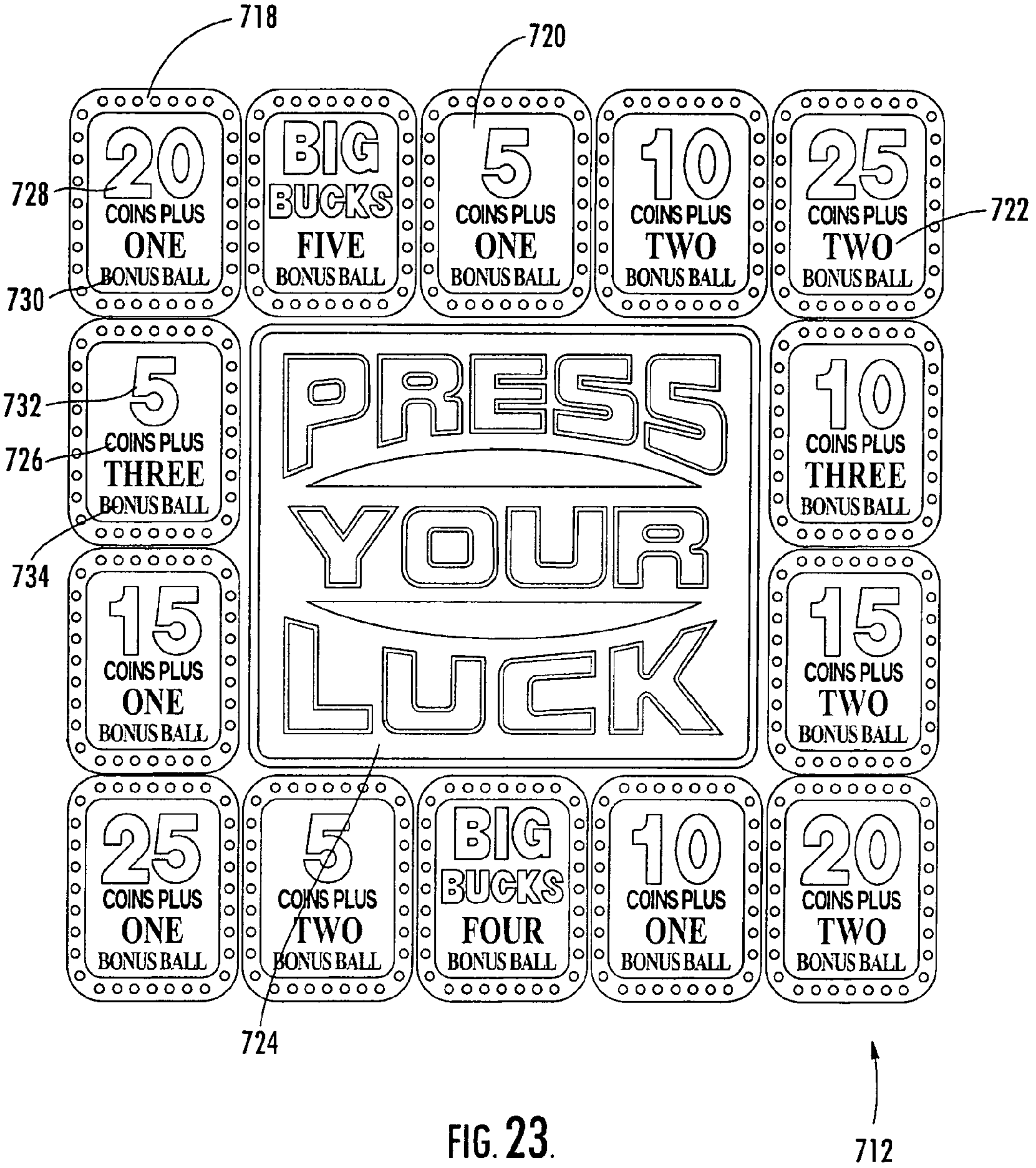
FIG. 23 is substantially a plan view of the game board of the gaming machine shown in FIG. 22.

With reference now to FIGS. 23 and 24, a preferred embodiment of the game board 712 is divided up into a number of different segments or positions, e.g., 718, 720, 722. When the game board 712 is activated to provide a bonus game to a player, each such segment, e.g., 718 may be intermittently or randomly back-lit in order to indicate or emphasize the various differing segments, e.g., 718, to the player. Other indicating devices, however, such as mechanical indicators, may also be used to indicate a segment.

When a prize or bonus event occurs in the base game-of-chance, a game board controller (not shown) within the gaming machine 700 preferably randomly indicates (lights or illuminates) one segment, e.g., 718, then another, e.g., 720, then another, e.g. 722, in seriatim (see 802 in FIG. 24). The indicated segments thus appear to jump from one particular segment, e.g., 718, to another particular segment, e.g., 722, on the bonusing game board 712. In an alternative embodiment, less than all of the segments may be activated. The number of segments activated may be determined by any other event or game outcome, such as the outcome of the base game.

This embodiment 700 further comprises a central game board button 724, which, when depressed, causes the game board controller (not shown) to terminate the random lighting of the various segments, e.g., 718, 720, 722. The bonus display 714 or other game display flashes in order to prompt the player to press the central game board button 724 bearing indicia, such as to inform the player to "PRESS YOUR LUCK" (see 804 in FIG. 24). When the player does so by pressing the central board button 724, the board game controller stops the random lighting sequence of the various segments, e.g., 718, 720, 722.

When the player has thus pressed the central game board button 724, the game board controller selects one particular segment, e.g., 726, and lights only that particular segment 726 (see 806 in FIG. 24). Alternatively, more than one segment may be activated and the player may win the sum or product of the prizes (indicia) displayed on the segments. The player can then see that this lighted segment, e.g., 726, is the segment that indicates, by award indicia on the lighted button, e.g., 726, the type of award that has been awarded to the player. This award may give the player the impression that by pressing the central game board button 724 at a certain time, the player determined the particular segment, e.g., 726, that was then lighted and therefore selected to indicate the award for the player. However, preferably a random number generator and virtual pay table cooperate with the board game controller, in a fashion well known to those skilled in the art, in order to select and cause the board game controller to light, the particular award segment, e.g., 726. A "time-out" feature may also be provided in order to have the board game controller automatically stop the random segment lighting sequence if the player does not press the central board game button 724 in a predetermined amount of time.

One or more segments, e.g., 718, may have a first prize indicia 728, such as a number of gaming coins or credits, and preferably also second prize indicia 730, such as the number of additional prize balls or spins, displayed on the segment 718. In this event, the total prize will then be awarded to the player by the gaming machine 700 as result of the cumulative award provided by or through the first and second prize indicia 728, 730. The total prize could be expressed as coins, currency, goods, services, etc.

Preferably, the number of prize ball indicia 730 represents the number of prize balls that will be randomly selected and displayed to the player via the prize display device 716 on the gaming machine 700. For example, an awarded segment, e.g., 726, may indicate five coins, as its first prize indicia 732, and three prize balls, as its second prize indicia 734 (see 808 in FIG. 24).

The jumbled ball display 714 may be activated before or after an award segment, e.g., 726, has been indicated (lighted or illuminated in the preferred embodiment). Once the award segment, e.g., 726, with a number of prize balls 734 has been indicated, the bonus or prize display device 716 begins to display a prize ball to the player. If a plurality of prize balls is indicated on the segment, a plurality of prize balls would be displayed to the player by the prize display device 716, and the player then would be awarded the sum of the prizes on the prize balls (plus any other prize indicated in the first award indicia, e.g., 732, for the particular award segment, e.g., 726). In the latter event (an award involving display of multiple prize balls), the display of the prize balls may be accomplished in a sequential or simultaneous manner depending on the embodiment of the bonus or prize display device, e.g., 716.

In the example of awarding the particular award segment 726 as discussed above, the indicated award of "5" coins 732 and "THREE" prize balls 734 would preferably translate to a possible total award to the player as follows: if the prize balls then displayed in the prize display device 716 indicate a "2" on one prize ball, a "3" on the second prize ball, and an "8" on the third prize ball shown in the prize display device 716, the player would be awarded 18 coins (5+2+3+8). Of course, the above-stated cumulative or total prize or bonus award would be only one of many possible outcomes for the given awarded segment, e.g., 726. The final total award varies depending on the numbers that are displayed on the three prize balls then selected (preferably as described above) and then displayed in the prize display device 716 (see 809 in FIG. 24).

Special symbols may be displayed on one or more of the possible prize balls that may be displayed in the prize display device 716. In one embodiment, a special symbol ("Whammy") has no award value (808 in FIG. 24). However, in this embodiment, if the player receives three such symbols on prize balls displayed in the prize display device 716, the player will be awarded the highest prize possible.

In yet another embodiment, the game board segments (not shown) may have a multiplier symbol or indicia and a prize ball number symbol or indicia. In this embodiment, the player can be awarded the product of the multiplier value and the sum of the prize units (e.g., gaming coins, currency amounts, services, products, etc.) displayed on the prize balls in the prize display device 716.

In another embodiment, the game board segments (not shown) have only prize ball number indicia. The player is then awarded the sum of the values of the prize balls displayed in the prize display device 716.

Of course, the game board 712 may itself provide a base gaming-of-chance or other game other than as a bonus game described above. In other words, the game board 712 may be included or substituted into many of a large variety of gaming devices that are configured to allow a player to place a wager and play a game. Of course, the game board 712 may also be utilized with differing structures and methods such as those described elsewhere herein, such as, for example, the rotating jumbled ball containers described below.

The game board 712 provides an interactive game that can increase player excitement and interest in playing the game board 712 game or in playing base or other games in conjunction with the game board to, for example, provide bonusing or award opportunities to the player. The game board 712 can also be provided in conjunction with existing game structures and devices without great additional expense in designing and manufacturing the board game for inclusion in this fashion.

Alternative Jumbled Ball Display Embodiments

Figure 14:
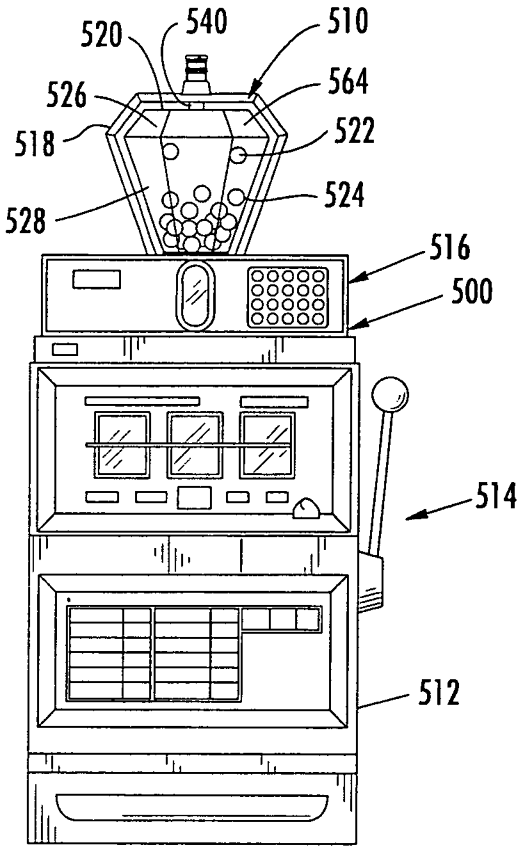
FIG. 14 is a substantially a front plan view of an alternative embodiment, having a moveable or action ball or unit container extending upwardly from the top section of the gaming machine housing.

With reference now to FIG. 14, another jumbled ball display embodiment 500 provides a jumbled action unit or action ball display container 510 rotatably mounted on the top of the gaming machine housing 512. The gaming machine housing 512 has mounted within it: an underlying gaming device, generally 514; a game ball selector display, generally 516, such as described in connection with other embodiments above; and the separate, rotatable action ball container 510 extending upwardly from the top of the gaming machine housing 512. The action ball container 510 has an outer frame 518 surrounding a window pane container 520 containing action balls, e.g., 522, 524, viewable from outside the container through the window pane side walls, e.g., 526, 528, of the container 520.

Figure 15:
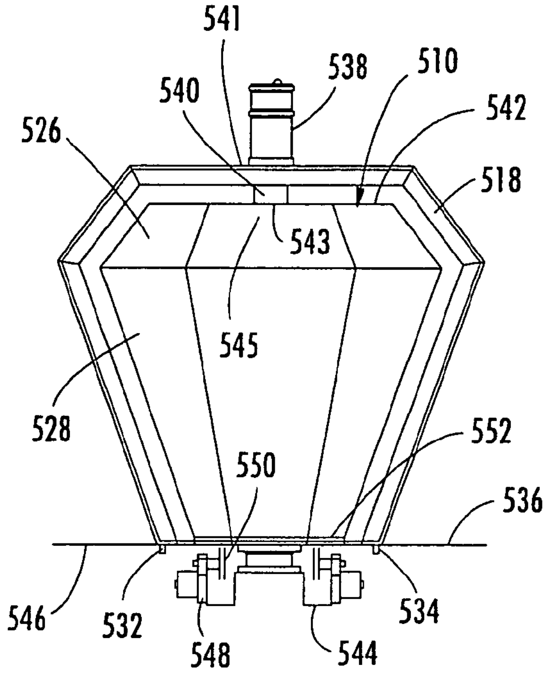
FIG. 15 is substantially a front plan, partially sectional view of the action ball container of FIG. 14 as mounted on a top planar mounting plate.

Referring now to FIG. 15, the window panes, e.g., 526, 528, are preferably made from clear or colored acrylic, such as aesthetically attractive lightly blue-tinted acrylic available from Tripp Plastics, Inc., Reno, Nev. The window panes, e.g., 526, 528, preferably are secured to each other by a durable, clear, and strong adhesive.

Alternatively, the window panes, e.g., 526, 528, could be made of tempered glass. The glass panes, 526, 528, may then be secured in a window frame structure (not shown) well known to those skilled in making window pane frame containers, such as those used to provide outside household lighting.

The outer frame 518, which is somewhat U-shaped, surrounds the periphery of the window pane structure and the external sides of the window panes, e.g., 526, 528, to penetrate mating mounting passages 532, 534 in a planar mounting plate 536 on the top of the gaming machine housing 512. A decorative frame cap 538 is mounted on the uppermost side 541 of the outer frame 518, and the top center of the outer frame 518 has an internal, vertically extending tubular frame bearing with associated bearing passage (not shown) that matingly receives an upwardly extending rod bearing 540, which penetrates the frame bearing passage in the frame bearing in the outer frame 518. In this fashion, the action ball container 510 may rotate about the axis of the with respect to the outer frame 518 about the axis of the upwardly extending rod bearing 540, which is secured at its lowermost section 543 to the top center 545 of the action ball container 510. The frame bearing passage and rod bearing 540 are both preferably made of ABS plastic, although other suitable bearing materials may readily be used as well.

A rotating drive assembly 544 is mounted to the underside 546 of the mounting plate 536. The rotating drive includes drive gears, e.g., 548, 550, that penetrate mating gear teeth slots (not shown) in a bottom drive plate 552 secured to the bottom of the container window frame structure.

Figure 16:
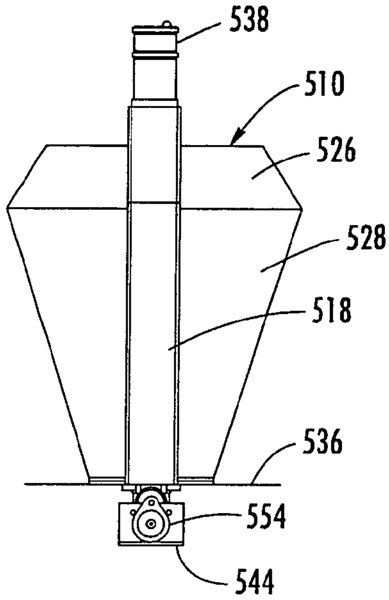
FIG. 16 is substantially a side plan, partially sectional view of the action ball container of FIG. 15.
Figure 17:
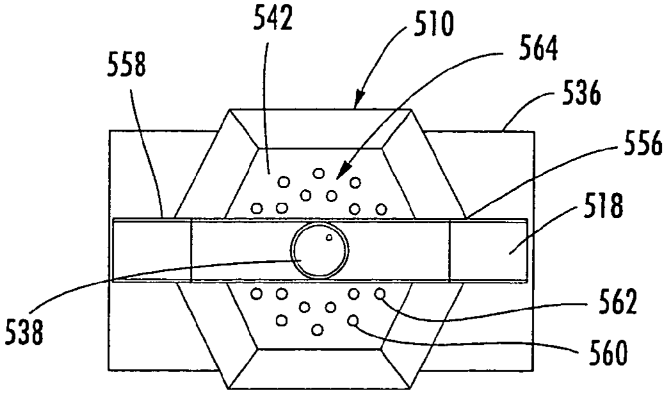
FIG. 17 is substantially a top sectional elevational view of the action ball container of FIG. 15.

With reference now to FIG. 16, it should be noted that the rotating drive assembly 544 includes a drive gear cover 554 not shown in FIG. 15. In addition, the outer frame 518 extends vertically upwardly from the mounting plate 536 and is relatively substantially narrower in width than the widths of a given window pane, e.g., 526, 528. As shown in FIG. 17, the outer frame 518 also extends laterally outwardly from, or to the side of, the window frame structure and the window panes, e.g., 526, 528, on opposing sides 556, 558 of the window frame structure.

With continuing reference to FIG. 17, the planar top 542 of the window frame structure consists of hexagonal window pane 542 with a number of air passages, e.g., 560, 562, penetrating the plate 542 to provide channels from the passage of air from within the interior container section, generally 564, bounded by the window frame structure and window panes, to the exterior of the interior container section. As shown in FIG. 14, the action balls or units 522, 524 are mounted and secured within this interior container section 564 by the action ball container 510, which is secured in position by the associated outer frame 518, frame bearing housing 538, and rod bearing 540 (FIG. 18).

Figure 18:
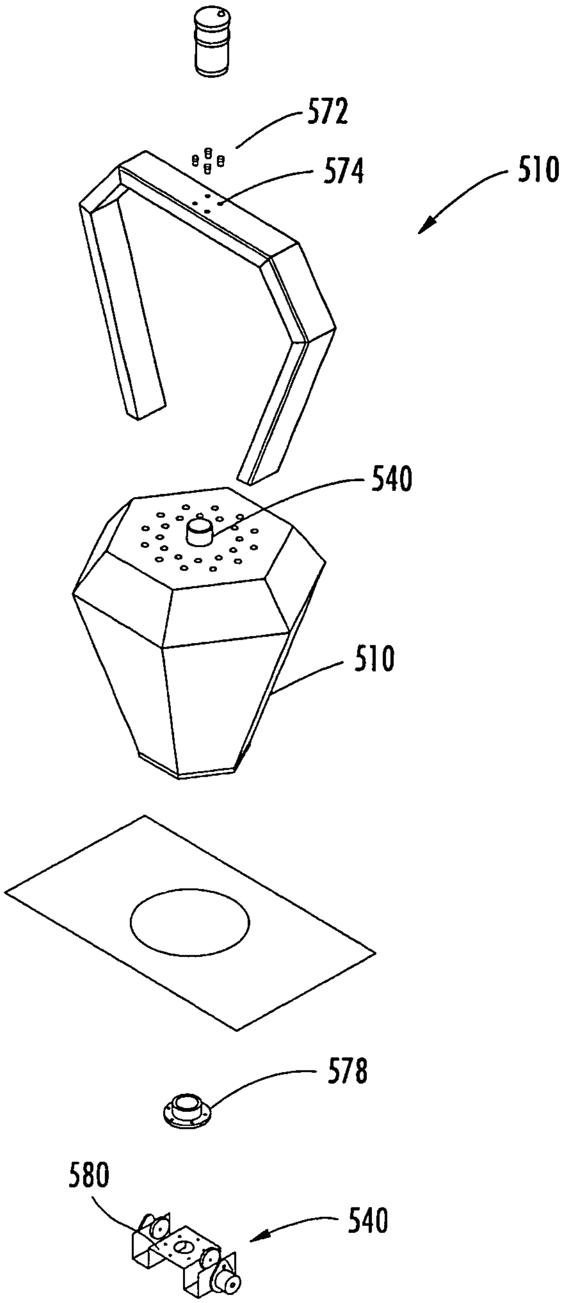
FIG. 18 is substantially an exploded view of the action ball container of FIG. 15.

With reference now to FIG. 18, the frame bearing housing 538 and its associated internally mounted frame bearing (not shown) are secured to outer frame 518 by fasteners, e.g., 572, penetrating fastener passages, e.g., 574, surrounding the axis of the frame bearing passage (not shown) in the outer frame 518. In turn, the rod bearing 540 penetrates the rod bearing passage in the frame bearing, and a lower, tubular ABS rod bearing 578 penetrates a mating horizontal bearing passage (not shown) in the bottom drive plate 552, as shown in FIG. 15. The lower ABS bearing 578 is secured by fasteners (not shown) to the top side 580 of the drive assembly 544 in order support the action ball container 510 in rotatable position with respect to the outer frame 518 on the top of the gaming machine housing 512 as shown in FIGS. 14 and 15.

Figure 19:
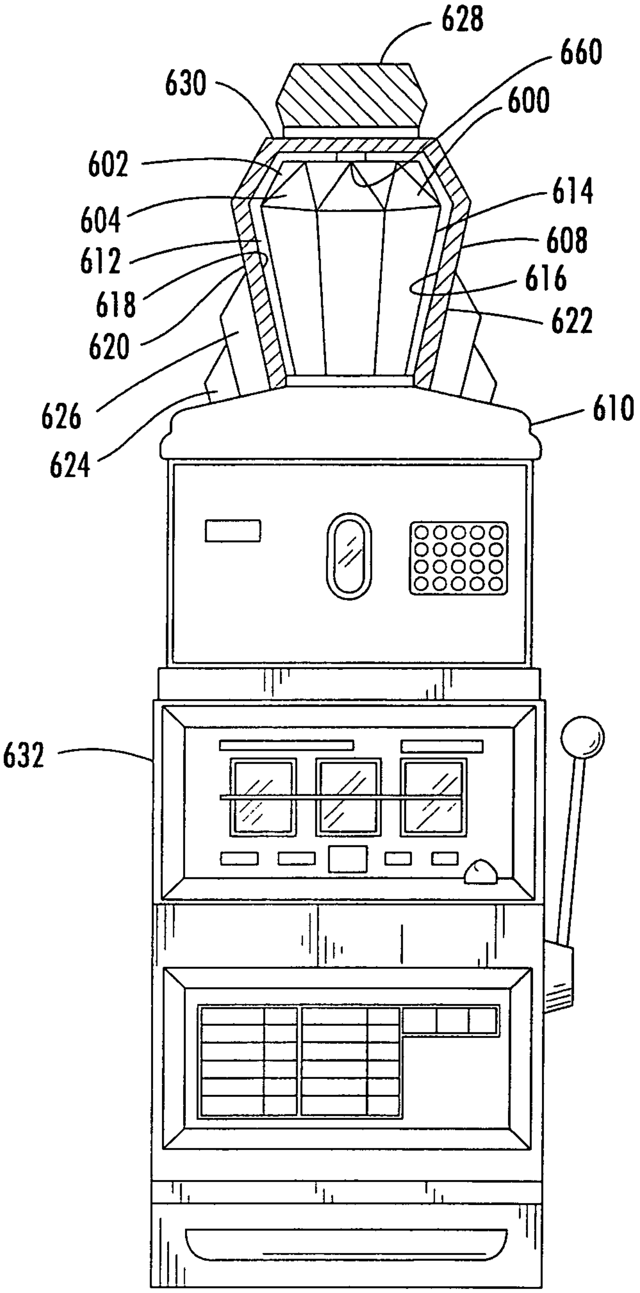
FIG. 19 is substantially a front plan view of a yet alternative embodiment, having a slip driven upwardly action ball container cooperatively mounted on an underlying gaming machine housing, and associated gaming machine apparatus, generally of the type shown above in FIG. 1A.
Figure 20:
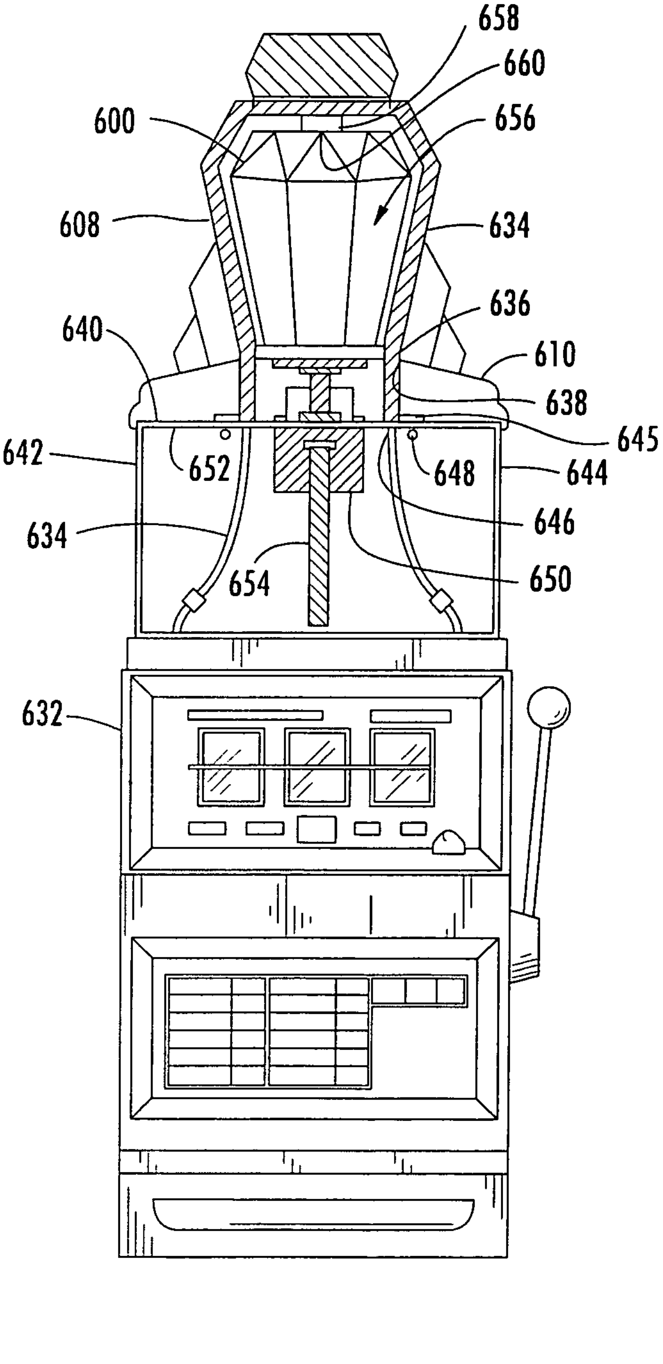
FIG. 20 is substantially a front plan, partially sectional view of the slip drive embodiment of FIG. 19 showing the slip drive and agitating air blower mounted below the action ball container.
Figure 21:
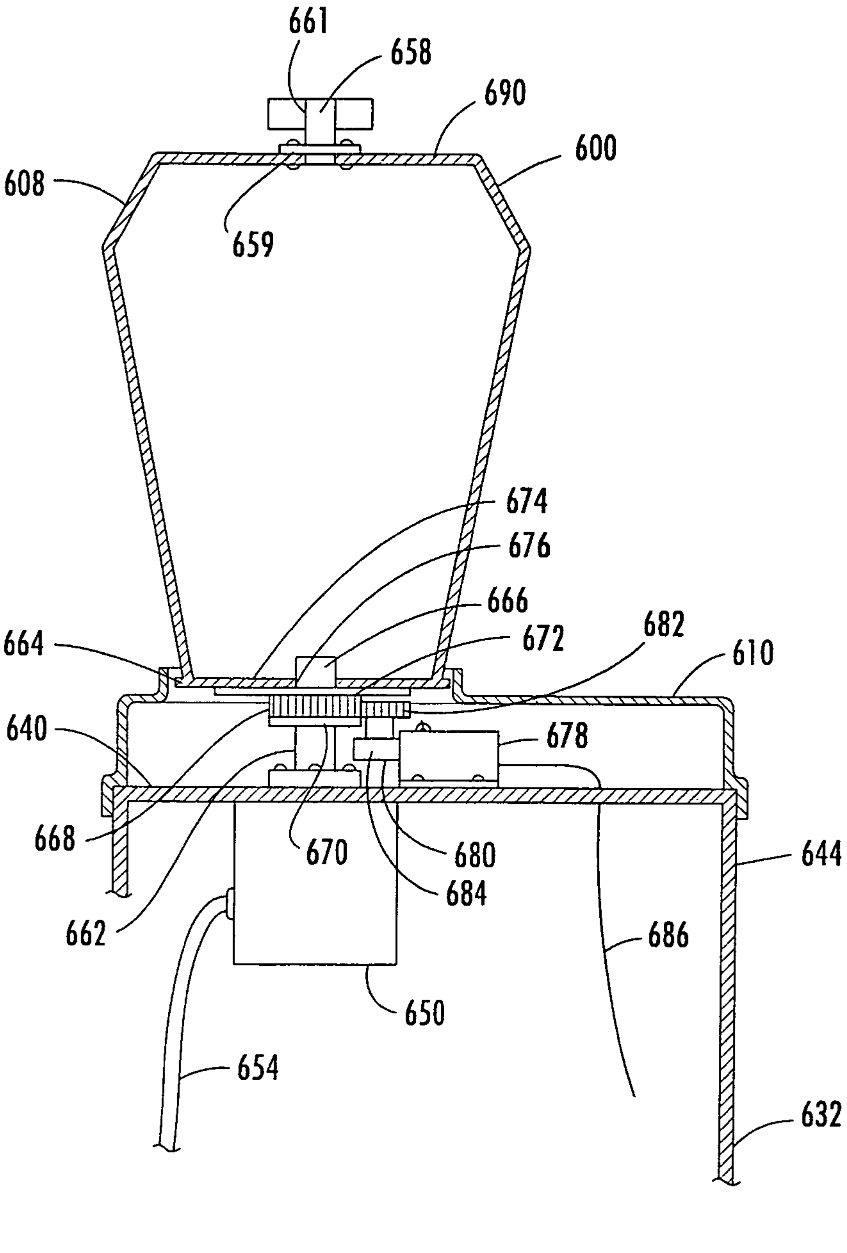
FIG. 21 is substantially a generally sectional side view of the action ball container of FIGS. 19 and 20 mounted on the upper housing section of the underlying gaming machine housing.

An alternative slip drive arrangement for an action ball or unit container 600 is shown in FIGS. 19-21. With reference to FIG. 19, this action ball container 600 has somewhat more window panes, e.g., 602, 604, in the upper section 606 of the action ball container 600. These window panes 602, 604 in the upper section 606 are each, e.g., 604, triangular rather than, as shown in FIG. 15, trapezoidal for upper window pane 526 in the FIG. 15 embodiment.

The FIG. 19 embodiment also includes a somewhat inverted U-shaped outer frame 608 extending upwardly from a plastic upper gaming machine housing cap 610 to surround the opposing lateral sides 612, 614 of the action ball container 600. The internal sides 618, 616 of the outer frame 608 adjacent the opposing lateral sides 612, 614 of the action ball container 600 include inwardly directed lighting LED's (not shown) facing toward the adjacent lateral sides 612, 614 in order to illuminate the action ball container 600 and its contents.

Adjacent each of the external opposing sides, e.g., 620, of the outer frame 608, a first upwardly extending attractor light bar 624 abuts a second upwardly extending attractor light bar 626, which in turn abuts the respective external side 620 of the outer frame 608. The first and second attractor light bars 624, 626 extend upwardly from the upper gaming machine housing cap 610, which is preferably made of rigid, resilient plastic or pressed metal.

A lighted game sign 628 extends vertically upwardly from the uppermost horizontally extending side 630 of the outer frame 608. Power is supplied to the lighted game sign 628, the attractor light bars, e.g., 624, 628, and the outer frame internal lighting LED's by wiring (not shown in FIG. 19; see, e.g., 634 in FIG. 20) passing through an internal wiring passage (not shown) in the outer frame 608, then through, as shown in FIG. 20, wiring passages (not shown) in the machine housing cap 610 into the gaming machine housing 632.

With continuing reference now to FIG. 20, each of the opposing outer frame legs, e.g., 634, has a lowermost vertically extending section 636, which penetrates a mating frame leg mounting passage 638 in the machine housing cap 610 to abut a planar, horizontally extending mounting plate 640 that extends from one outer lateral side 642 of the gaming machine housing 632 to the gaming machine's opposing outer lateral side 644. Each vertically extending section, e.g, 636, has an integral bent, horizontally extending support arm 645 extending outwardly from the lowermost edge 646 of the vertically extending section 636, and a fastener 648 secures the support arm, and thereby the outer frame 608, to the mounting plate 640. Preferably, the fastener 648 consists of a bolt section welded, and extending downwardly from, to the lower side of the horizontal support arm 645 and a mating nut threaded to the bolt section.

An air blower 650 is mounted to the underside 652 of the mounting plate 640. A wiring harness 654 is secured to the air blower 650 to provide power from a power supply (not shown) in the gaming machine housing 632. The air blower 650 provides compress air through air supply passages (not shown in FIG. 20) into the lowermost interior section, generally 656, within the action ball container 600. The compressed air thus agitates and moves lightweight plastic action balls (such as Keno balls, not shown) in the action ball container 600 and then exits upper air passages (not shown) extending centrally, vertically, and co-axially upwardly through the action ball container 600, an upper ABS tubular outer frame bearing 658 secured, as shown in FIG. 21, at its lower end 659 by fasteners to the axial center of the generally planar top section 660 of the action ball container 600 and retained at its upper end 661 within a mating aperture in the outer frame 608.

With continuing reference to FIG. 21, the air blower 650 provides an upwardly extending air supply tube (not shown) that extends through an air tube passage (not shown) in the mounting plate 640 to penetrate a coaxial air tube passage (not shown) in a substantially tubular ABS support tube 662 secured to and extending vertically upwardly from the mounting plate 640. The uppermost planar edge of the ABS support tube 662 supports a matingly abutting metal ring bearing 670. The upper and lower surfaces of the ring bearing 670 may be planar or may have radially extending ridges, providing less friction contact between the ring bearing 670 and abutting surfaces.

An ABS driven external spur gear 664 has a tubular, compressed air supply delivery section 666 extending vertically above and below an integral, horizontally or laterally outwardly extending driven spur gear tooth plate section 668, the lower planar surface of which rests on the upper surface of the ring bearing 670. The lower tubular section (not shown) of the driven external spur gear 664 matingly penetrates a central circular aperture in the ring bearing 670 to also penetrate the upper tubular interior (not shown) of the ABS support tube 662.

A planar slip drive ring 672 in turn rests on, and is thereby in driving contact with, the upper planar surface of driven spur gear tooth plate section 668 with the upper tubular section of the ABS driven external spur gear 664 penetrating through and extending upwardly above the generally horizontally disposed slip drive ring 672. The diametral width of the slip drive ring 672 is substantially wider than the diametral width of the driven spur gear tooth plate section 670 but only slightly less than the diametral width of the circular bottom plate 674 of the action ball container 600. The circular bottom plate 674 thus rests on, and is also in driving contact with, the upper surface of the slip drive ring 672 and has an axially centered support and air supply aperture 676, through which the upper tubular section of the ABS driven external spur gear 664 passes in order to secure the action ball container 600 while providing an agitating air supply passage into the lower section of the action ball container 600. The slip drive ring 672 is preferably made of a rigid, resilient plastic and has roughened (not smooth or flat) upper and lower surfaces in order to increase frictional driving contact with abutting surfaces of the ABS driven spur gear 664 and the circular bottom plate 674 described above.

A substantially inverted U-shaped pinion drive housing 678 is secured by fasteners to the upper side of the mounting plate 640 laterally spaced from external periphery of the ABS driven external spur gear 664. A pinion drive 680 is mounted by fasteners substantially within the confines of the pinion drive housing 678 but with its axial pinion gear drive section 684 extending laterally or horizontally outwardly from the pinion drive housing 678 in the direction of the ABS driven external spur gear 664 in order to drive an ABS pinion spur gear 682, which matingly engages the driven spur gear tooth plate section 668 in order to drive rotation of the ABS driven spur gear 664 when the pinion drive 680 is activated. When the pinion drive 680 is activated, the ABS pinion spur gear 682 thus drives rotation of the slip drive ring 672 through friction contact between the slip drive ring 672 and the ABS driven external spur gear 664, which in turn drives rotation of the circular bottom plate 674 and thereby the action ball container 600 through friction contact between the slip drive ring 672 and the circular bottom plate 674.

Power wiring 686 is secured at one end to the pinion drive 680 and passes through an aperture 688 in the mounting plate 640 in order to connect to a power supply (not shown) within the gaming machine housing 632. The pinion drive 680 is activated upon receipt of electrical power through this power wiring 686, and preferably, this electrical power, as well as that to the air blower 650, is provided during the entire time the gaming machine within the gaming housing 632 is activated. In this fashion, the rotatable action ball container 600 rotates and agitates action balls within the action ball container 600 whenever the underlying gaming machine is turned on except when, as a result of the slip drive arrangement, the action ball container 600 ceases rotation due to interference with the rotation of the action ball container 600 by, for example, contact with a patron or interfering object. The action ball container 600 resumes rotation automatically upon removal of the interference provided that power is still being provided to the pinion drive 680.

One advantage of the alternative action ball container embodiments are that they each can provide a rotating, simulated agitated action ball container that attracts attention to the underlying gaming machine, as well as to any other associated machines in the vicinity of the underlying gaming machine. These embodiments also can provide the impression that outcome balls are selected from this container, while avoiding problems—such as environmental or regulatory problems—associated with game ball selection of an outcome-determinative game ball from agitated game balls in a container. These embodiments can thus allow a game player to play a keno-like or other game ball or action unit selection game, while avoiding environmental or regulatory problems associated with games that select from among visible, agitated action balls or other action units to provide outcome or award balls for display to the game player.

At least one embodiment may provide an action ball or unit container with a slip drive linkage between the action ball container and container drive. The slip drive preferably renders this embodiment less likely to be damaged by persons or objects that may interfere with the rotation of the container. At the same time, this slip drive embodiment also can be less likely to damage anything that may come into contact with the rotating action ball container, such as by falling between the container and the frame surrounding the container. The slip drive may allow the rotating container to (i) stop rotating when the drive faces sufficient (and preferably relatively slight) resistance, and then (ii) automatically resume rotating of the action ball container when the resistance is removed with the container still in position on the gaming machine housing.

It can thus be seen that the preferred embodiments can solve one or more among problems associated with the prior art or provide advantages over prior art devices. One embodiment of the present invention provides a gaming device that utilizes a highly visible display device that may be used with a primary game or a bonus game. This embodiment can provide a display device that utilizes physical objects in the form of a jumbled ball display device that is similar to the well-known game of Keno and other games that utilize jumbled balls. This embodiment also can provide a display device that eliminates environmental influences on the outcome of the game. This embodiment can, in addition, provide a display device that reduces the risk of tampering, requires no human operators, and requires little maintenance.

Another embodiment can provide a rotatable container of agitated action balls that are also most preferably relatively inaccessible to general environmental influences. These action balls can add excitement and more realism to the gaming experience provided by the gaming machine and a separate game ball selector display that is also most preferably relatively inaccessible to general environmental influences during use of the gaming machine to play a game.

There are other features and advantages of one or more the various embodiments. They should be apparent to those skilled in the art based on the disclosure above.

Although the description above contains many specifications, these should not be construed as limiting the scope of the invention but as merely providing illustrations of some of the presently preferred embodiments of this invention. This specification above, for instance, makes reference to bonus prizes. However, the present invention is not thereby intended to be limited to providing bonus prizes. Rather it is intended that the present invention can, in certain embodiments, be used independently as a stand-alone game without necessarily including bonusing. Thus, the scope of the invention should be determined by the claims as issued and their legal equivalents rather than by the preferred examples given.

What is claimed is:

1. A method of playing a game, the method comprising the following, but not all necessarily in the order shown:

(A) providing a plurality of activatable segments, each activatable segment being configured to communicate a potential outcome of the game;

(B) randomly and sequentially activating and deactivating the plurality of activatable segments of the display device;

(C) providing a player input device;

(D) allowing a player to manipulate the player input device while the plurality of activatable segments are being randomly activated and deactivated;

(E) randomly determining the outcome of the game;

(F) determining at least one activatable segment that communicates the outcome of the game; and (G) subsequent to the player manipulating the player input device, activating the activatable segment of the display device that communicates the outcome of the game in such a way to communicate the outcome of the game to the player, wherein it appears that the outcome of the game was at least partially influenced by when the player manipulated the player input device.

2. The method of claim 1 wherein the automatic activating of a particular activatable segment comprises illumination of the particular activatable segment.

3. The method of claim 1 wherein the game is a bonus game.

4. The method of claim 1 further comprising determining a plurality of activatable segments that communicates the outcome of the game and activating the plurality of activatable segments of the display device that communicates the outcome of the game thereby communicating the outcome of the game.

5. The method of claim 1 wherein the plurality of activatable segments each have at least one of a plurality of indicia displayed thereon.

6. A gaming device, the gaming device comprising:

(A) a plurality of activatable display segments positioned to be viewed by a player, each display segment being configured to be individually activated and to communicate a potential outcome of a game;

(B) a player input device positioned to be activated by the player, the player input device being configured to transmit a signal when the player activates the input device; and (C) a controller in communication with each display segment and the player input device, the controller being configured to:

(a) cause the display segments to be randomly and sequentially activated and deactivated;

(b) randomly determine an outcome of the game;

(c) determine at least one display segment that can communicate the outcome of the game;

(d) receive the signal produced by the input device, when the player activates the input device;

(e) cause the display segments to stop being randomly and sequentially activated and deactivated; and (f) cause the display segment that can communicate the outcome of the game to be activated, wherein the outcome of the game is communicated to the player and it appears that the outcome of the game was at least partially influenced by when the player activated the player input device.

7. The gaming device of claim 6 further comprising a game apparatus in communication with the controller, the game apparatus being configured to allow a player to place a wager and play a game.

8. The game device of claim 6 further wherein the gaming device is configured to allow a player to play a bonus game.

9. The gaming device of claim 6 wherein the activatable display segments depict segments on a board of a board game.

10. The gaming device of claim 6 wherein the controller is further configured to determine a plurality of display segments that can communicate the outcome of the game and cause the plurality of display segments that can communicate the outcome of the game to be activated.

11. The gaming device of claim 6 wherein the plurality of display segments each have at least one of a plurality of indicia displayed thereon.

12. The gaming device of claim 6 wherein the display segments are positioned around the player input device.

13. A gaming device, the gaming device comprising:

(A) display means for communicating a plurality of potential and actual outcomes of a game;

(B) random activation means for causing the display means to randomly and sequentially display potential outcomes of the game;

(C) player input means for receiving player input;

(D) random outcome means for randomly determining an outcome of the game;

(E) outcome display means for causing the display means to display the outcome of the game thereby communicating the outcome of the game to the player, wherein it appears that the outcome of the game was at least partially influenced by when the player activated the player input device.

14. The gaming device of claim 13 further comprising a game apparatus means for allowing a player to place a wager and play the game.

15. The gaming device of claim 13 wherein the display means further include at least one of a plurality of indicia means displayed thereon.

16. The gaming device of claim 13 wherein the display means are positioned around the player input means.

* * * * *